United States Patent
Tomita et al.

(10) Patent No.: US 7,797,385 B2
(45) Date of Patent: Sep. 14, 2010

(54) IMAGE PROCESSING APPARATUS, MANAGEMENT APPARATUS AND IMAGE PROCESSING METHOD THAT REDUCE DELAYS IN PRINT JOB PROCESSING CAUSED BY REWRITING OF FIRMWARE

(75) Inventors: Atsushi Tomita, Toyohashi (JP); Hideki Hino, Toyokawa (JP); Hideo Mae, Toyokawa (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 803 days.

(21) Appl. No.: 10/216,909

(22) Filed: Aug. 13, 2002

(65) Prior Publication Data

US 2003/0037115 A1 Feb. 20, 2003

(30) Foreign Application Priority Data

Aug. 16, 2001 (JP) .............................. 2001-247410

(51) Int. Cl.
*G06F 15/16* (2006.01)
*G06F 15/173* (2006.01)
*G06F 9/46* (2006.01)

(52) U.S. Cl. ........................ 709/206; 709/223; 718/100

(58) Field of Classification Search ................. 709/206; 382/305; 717/168, 171, 173–174, 176, 178
See application file for complete search history.

(56) References Cited

U.S. PATENT DOCUMENTS

| | | | | |
|---|---|---|---|---|
| 6,892,239 B1 * | 5/2005 | Kirkeby | ...................... | 709/226 |
| 6,981,254 B2 * | 12/2005 | Parry | ........................... | 718/100 |
| 2001/0003827 A1 * | 6/2001 | Shimamura | .................. | 709/206 |
| 2002/0157090 A1 * | 10/2002 | Anton, Jr. | .................... | 717/178 |

FOREIGN PATENT DOCUMENTS

| | | |
|---|---|---|
| EP | 1 003 307 A2 | 5/2000 |
| JP | 10-187368 | 7/1998 |
| JP | 11-007382 | 1/1999 |
| JP | 11-161442 | 6/1999 |
| JP | 2000-326539 | 11/2000 |

* cited by examiner

*Primary Examiner*—Peling A Shaw
(74) *Attorney, Agent, or Firm*—Buchanan Ingersoll & Rooney PC

(57) ABSTRACT

An image processing apparatus checks a next job to be executed, and if the job is a firmware rewriting job, accesses a mail server, downloads e-mail, and obtains a job type of a job attached to the e-mail. If the job is a print job, the image processing apparatus extracts image information pertaining to the job from the e-mail, stores the image information, registers the job in a job management table, and ends processing. If there are no print jobs, the image processing apparatus executes the firmware rewriting job, deletes the job from the job management table, and ends the processing.

12 Claims, 20 Drawing Sheets

FIG.8

| No. | model | e-mail address | other information |
|---|---|---|---|
| 1 | model1 | device1@customer1.com | ... |
| 2 | model2 | device2@customer1.com | ... |
| 3 | model3 | device3@customer2.com | ... |
| ⋮ | ⋮ | ⋮ | ⋮ |

FIG.10 header section:
- From: abc123@service_center.com
- To: device1@customer1.com
- Date:10 Jan 01 13:18:43 +0900
- Subject: model1_1
- MIME-Version:1.0
- Content-type:multipart/mixed;boundary="5kvrZF/hrA"
- Content-Description: Firmware ↕ blank (null line)

body section:
--5kvrZF/hrA
Content-Type:application/octet-stream ;name=firmware1.dat
Content-Transfer-Encoding:base64

AXAAABQAAAMAAQ9RAQoNEgAAAAAXAAABQAAAMAAQ9RAI
AAAAHgAAAAHgAV0MDZAdGRjLm1pbm9sdGEuY28uanAKAA ImBBADEAAWVwbmV0MDZAdGRjLm1pbm9sdGEuY28uanAKAAA
XAAABQAAAMAAQ9RAQoNEgAAAAAHgAAAAHgAQoNEgAAA
AA=

--5kvrZF/hrA--

FIG.12

| job number | job type | supplementary information | address |
|---|---|---|---|
| 1 | 1 |  | 0x1000 |
| 2 | 1 |  | 0x2000 |
| 3 | 1 |  | 0x3000 |
| 4 | 2 | 1 | 0x4000 |
| : | : | : | : |

FIG.19 header section
- From: abc123@customer2.com
- To: device1@customer1.com
- Date:10 Jan 01 13:18:43 +0900
- Subject: iFAX document
- MIME-Version:1.0
- Content-type:multipart/mixed;boundary="5kvrZF/hrA"
- Content-Description: iFAX ↕ blank (null line)

body section
- —5kvrZF/hrA
- Content-Type:image/tiff ;name=image1.dat
- Content-Transfer-Encoding:base64

AXAAABQAAAMAAQ9RAQoNEgAAAAAXAAABQAAAMAAQ9RAI
AAAAHgAAAAHgAV0MDZAdGRjLm1pbm9sdGEuY28uanAKAA ImBBADEAAWVwbmV0MDZAdGRjLm1pbm9sdGEuY28uanAKAAA
XAAABQAAAMAAQ9RAQoNEgAAAAAHgAAAAAHgAQoNEgAAA
AA=

—5kvrZF/hrA—

IMAGE PROCESSING APPARATUS, MANAGEMENT APPARATUS AND IMAGE PROCESSING METHOD THAT REDUCE DELAYS IN PRINT JOB PROCESSING CAUSED BY REWRITING OF FIRMWARE

This application is based on application No. 2001-247410 filed in Japan, the contents of which are hereby incorporated by reference.

BACKGROUND OF THE INVENTION (1) Field of the Invention

The present invention relates to an image processing apparatus that obtains image data from a server and processes the image data, and in particular to reducing delays in image processing that occur when rewriting the image processing apparatus' firmware.

(2) Related Art

Recently image processing apparatuses that include a so-called Internet fax function for transmitting and receiving image information with use of e-mail (electronic mail) are becoming common. This kind of image processing apparatus accesses a mail server regularly to obtain e-mail, and prints out image information that is attached to the e-mail.

However, since the firmware used in such image processing apparatuses is increasing in size, processing for rewriting the firmware may take tens of minutes. Since the image processing apparatus is unable to obtain e-mail or execute print jobs while the firmware is being rewritten, printing out is delayed.

SUMMARY OF THE INVENTION

In view of the above-described problem, the object of the present invention is to reduce delays in printing out caused by firmware rewriting in the image processing apparatus, and especially to improve delays in printing out image information attached to e-mail.

In order to achieve the stated object, the present invention is an image processing apparatus that obtains image data from a server, and processes the obtained image data, including: a firmware rewriting unit that executes firmware rewriting processing; an image data obtaining unit that, on detecting that the firmware rewriting unit is to execute the firmware rewriting processing, obtains the image data from the server before the firmware rewriting unit executes the firmware rewriting processing; an image data processing unit that processes the image data obtained by the image data obtaining unit; and a processing control unit that, after the image data processing unit processes the image data, has the firmware rewriting unit execute the firmware rewriting processing.

According to the stated structure, the mail server is accessed directly before beginning the firmware rewriting, and the firmware rewriting is executed after any image data that has arrived at the server is processed. Therefore, delays in processing image data that has arrived at the mail server caused by not being able to access the mail server because of firmware rewriting processing can be reduced.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 8 shows the structure of a registration information table in the host computer;

FIG. 10 shows an example of the structure of e-mail to which firmware is attached, and in particular, a header section of the e-mail;

FIG. 12 shows an example of a job management table in the management unit;

FIG. 19 shows an example of the structure of e-mail to which image information is attached, and in particular, the structure of the header section.

DESCRIPTION OF THE PREFERRED EMBODIMENTS

The following describes examples of Internet fax systems as embodiments of the present invention.

First Embodiment (1) Structure of the System

Figure 1:
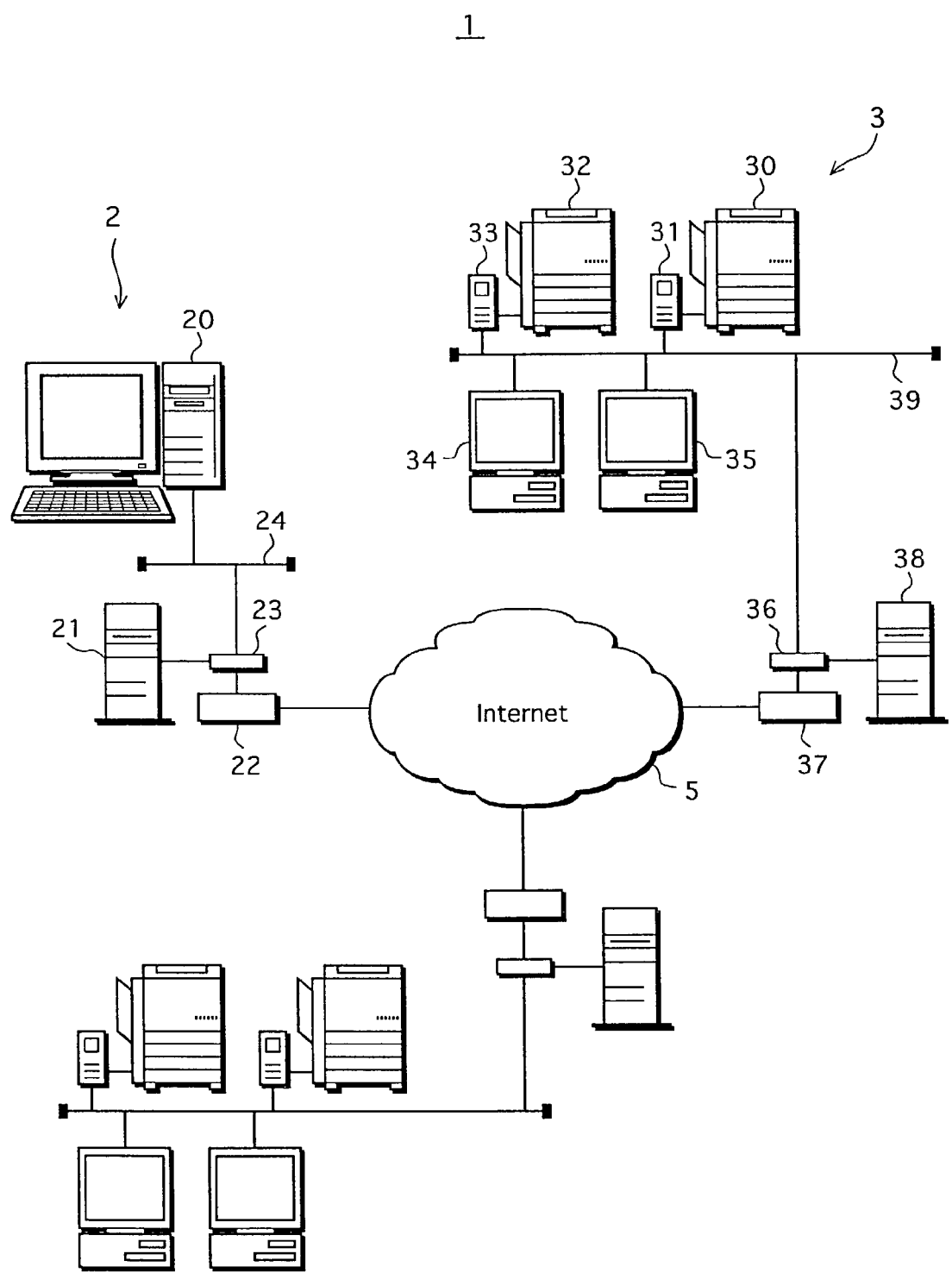
FIG. 1 shows the structure of an Internet fax system in a first embodiment.

FIG. 1 shows the structure of the Internet fax system (hereinafter referred to simply as a "fax system") of the present embodiment. A fax system 1 in FIG. 1 is composed of sub-systems 2 to 4 which are connected by the Internet 5. The sub-systems 3 and 4 are user sites that include image processing apparatuses that have Internet fax functions. The sub-systems 3 and 4 send each other e-mail to which image information is attached, and have the recipient image processing apparatus print out the image information.

The sub-system 2 is a so-called service center that sends firmware that is used in the image processing apparatuses in the sub-systems 3 and 4, via the Internet. Note that other user sites besides the sub-systems 3 and 4 are also connected to the fax system 1, but since such user sites have the same structure as the sub-systems 3 and 4, an explanation thereof is omitted.

Each of the sub-systems 2 to 4 includes a LAN (local area network), and is connected to the Internet 5 via a router. Each of the routers has a firewall connected thereto for maintaining security. A firewall 36 has functions such as packet filtering and proxying, and permits passage only of packets whose transmission-origin IP address (host name), destination ID address (host name), transmission-origin port number, destination port number, and data fulfill predetermined conditions.

The firewalls in the fax system 1 are set to permit passage of packets that conform to SMTP (simple mail transfer protocol, specified by RFC821), in other words e-mail. Each of the sub-systems 2 to 4 also includes a mail server that is capable of attaching image information or firmware to e-mail, and receiving and transmitting such email. Note that the firewalls are usually set to allow packets that conform to SMTP to pass, since such packets are generally used for e-mail. Therefore, by attaching image information or firmware to e-mail, most user sites (sub-systems) are able to use the fax system 1, regardless of whether they have a firewall or not.

Note that in the fax system 1 image information is transmitted and received attached to e-mail in compliance with IETF (Internet Engineering Task Force) RFC (Request for comments) 2301 to RFC2306 and ITU-T (International Telecommunication Union-Telecommunication Standardization Sector) Recommendations T.37.

(1-1) Structure of the Sub-System 2

The sub-system 2, as described above, has a construction in which a router 22, a firewall 23, a mail server 21 and so on are connected to a LAN 24, and the LAN 24 is further connected to a host computer 20.

Figure 2:
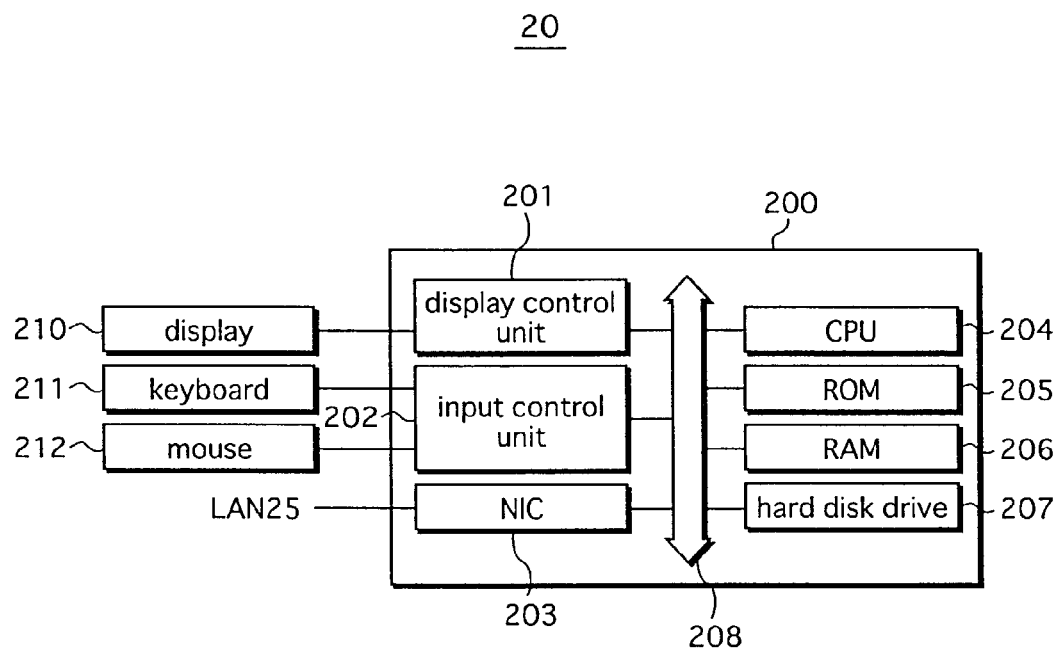
FIG. 2 shows the structure of the hardware of a computer unit in a host computer, and its peripheral devices.

FIG. 2 shows the construction of hardware of a host computer 20. The host computer 20 is composed of a computer unit 200, and a display 210, a keyboard 211 and a mouse 212 that are connected to the computer unit 200. The computer unit 200 is composed of a CPU (central processing unit) 204, and ROM (read only memory) 205 and so on that are connected to each other by an internal bus 208. After booting following a booting program stored in the ROM 205, the CPU 204 reads an OS (operating system) from a hard disk drive 207, and commences ordinary processing.

A RAM (random access memory) 206 is a working memory. The CPU 204 outputs video to the display 210 via a display control unit 201. An input control unit 202 receives an input signal from the keyboard 211 or the mouse 212, and passes input data to the CPU 204. An NIC (network interface card) 203 executes communication processing in order for the host computer 20 to communicate with other devices.

Note that firmware and a data base are stored in the hard disk drive 207. The registration information about the model, the e-mail address and the like of each image processing apparatus is stored in the data base. Different firmware is stored for each model of image processing apparatus. As will be described later, each image processing apparatus has a plurality of control modules that each execute different firmware. The hard disk drive 207 stores firmware for each module in each model in a separate folder (directory), so that it can easily extract the appropriate firmware.

The keyboard 211 includes 12 function keys, F1 to F12. In particular, the F1 key through to the F3 key have characters such as the following thereon displaying the function corresponding to the particular key. The F1 key is for activating a program that sets necessary parameters for the host computer 20 to transmit and receive e-mail. This function is indicated by "communication settings" on the F1 key.

The F2 key is for activating a program for registering image processing apparatuses that are to be controlled by the host computer 20 in the database in the hard disk drive 207. This function is indicated by "apparatus registration" on the F2 key. The F3 key is for activating a program in the host computer 20 for rewriting the firmware in one of the image processing apparatuses. This function is indicated by "rewrite" on the F3 key.

(1-2) Structure of the Sub-System 3

The following describes the sub-system 3. The sub-system 3, as described above, has a structure in which a router 37, a firewall 36, a mail server 38 and so on are connected to a LAN 39. Image processing apparatuses 30 and 32 are connected to the LAN 39 via management units 31 and 33 respectively. In addition, personal computers (hereinafter "PC(s)") 34 and 35 are connected to the LAN 39. Although in the description here two image processing apparatuses and two PCs are connected to the LAN 39, these numbers are not limited to two. Any number is possible.

The image processing apparatuses 30 and 32 receive print jobs from the PCs 34 and 35 via the LAN 39, and execute print processing accordingly. Furthermore, the management units 31 and 33 regularly access a mail server 38 to download e-mail, and have the image processing apparatuses 30 and 32 respectively print out image information attached to the e-mail. In addition, when firmware is attached to the e-mail (described later), the management units 31 and 33 perform firmware rewriting processing.

(1-2-1) Structure of the Image Processing Apparatuses

The following describes the structure of the image processing apparatus 30 with reference to the drawings. Note that the structure of the image processing apparatus 31 is the same as that of the image processing apparatus 30, and thus the following description also applies to the image processing apparatus 31.

Figure 3:
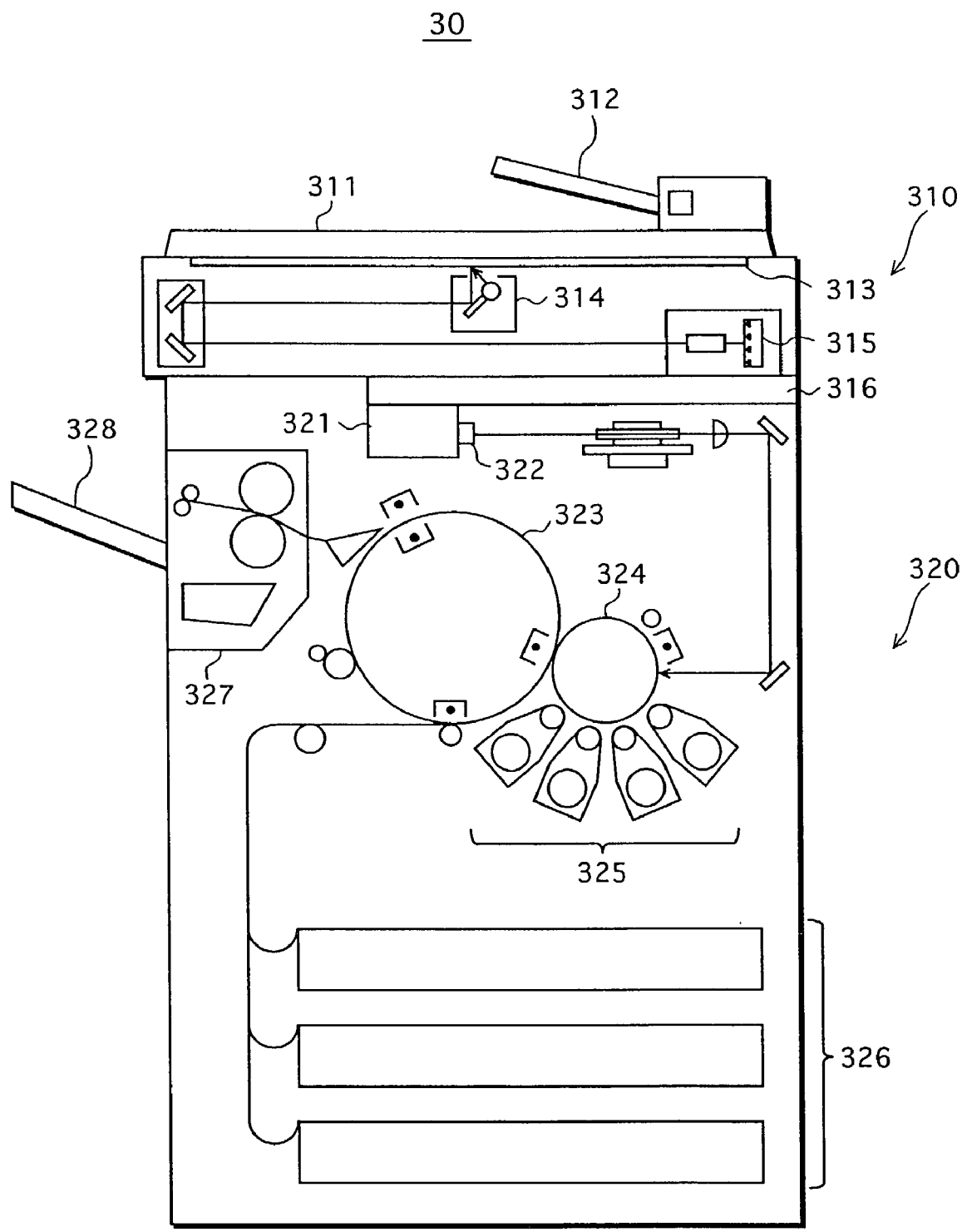
FIG. 3 shows the main components of the hardware of an image processing apparatus.

FIG. 3 shows the structure of the hardware of the image processing apparatus 30. The image processing apparatus 30 is a so-called MFP (multiple function peripheral), and can be roughly divided into two units: an image reader unit 310 for reading documents, and a printer unit 320 for forming images on print paper. An automatic document feeding device 311 in the image reader unit 310 conveys documents from a document tray 312 to document platform glass 313. A scanner 314 scans the document, and light reflected from the surface of the document is converted to an electric signal by a CCD sensor 315. A signal processing unit 316 converts the signal to image data and stores the image data in an image memory.

A laser control unit 321 has a laser diode 322 emit a laser based on the image data. This laser forms a electrostatic latent image on a photosensitive drum 324. The electrostatic latent image is made into a toner image by a toner developing device 325. At the same time this is takes place, print paper is conveyed from a sheet feeder cassette 326 and wound around a transfer drum 323. After the toner image is transferred to the print paper, the print paper is removed from the transfer drum 323, subjected to a fixing process by a fixing device 327, and discharged to a tray 328.

Figure 4:
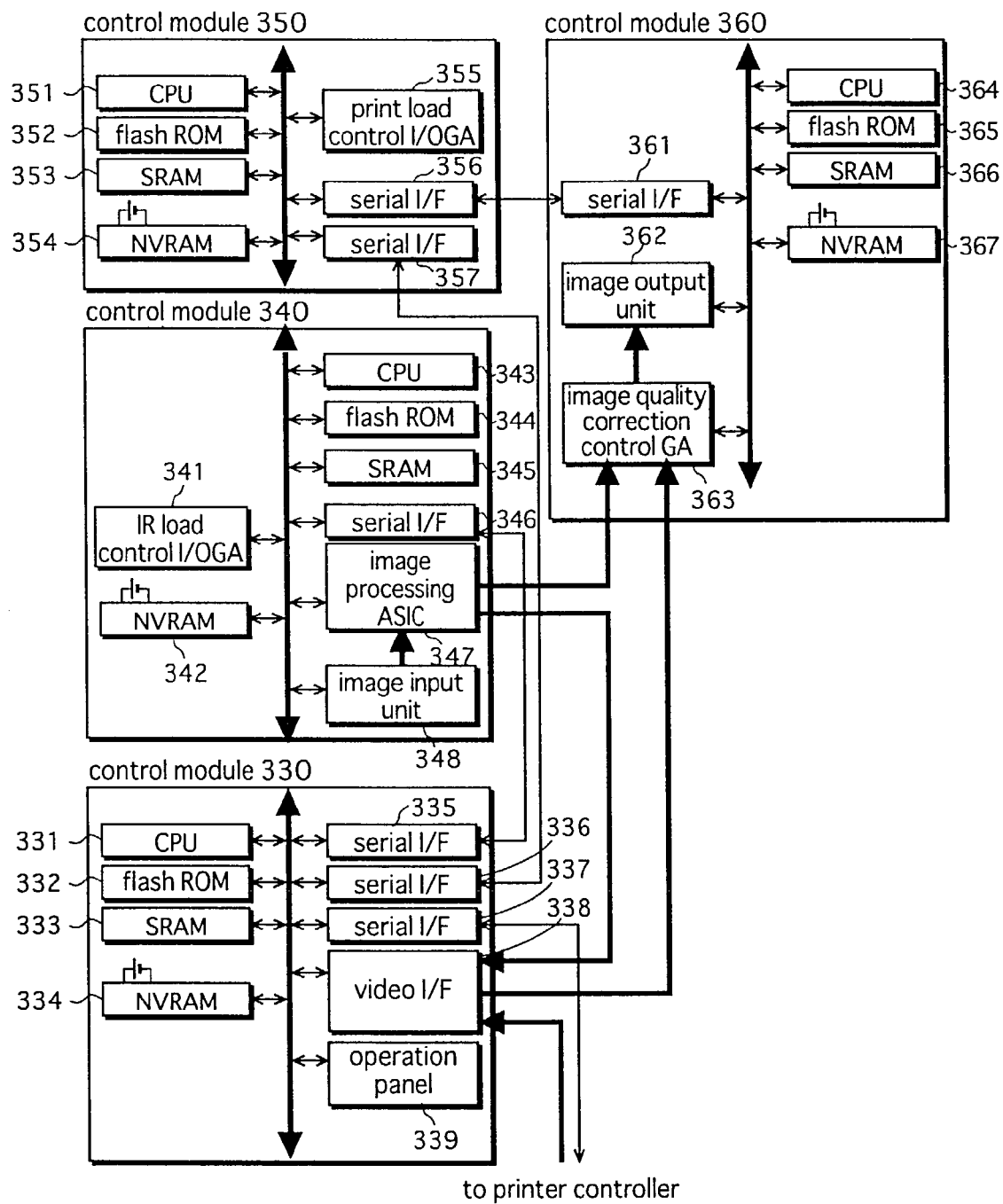
FIG. 4 shows the construction of the hardware of control modules in the image processing apparatus.

The image processing apparatus 30 has four control modules, which are shown in FIG. 4, for executing various types of processing. FIG. 4 shows the respective structures of the hardware of control modules 330, 340, 350 and 360. Each of the control modules 330 to 360 has a CPU for executing firmware corresponding to the function of the particular control module. Furthermore, the control modules 330 to 360 are connected to each other by serial cables (cross type) to enable mutual communication in order to coordinate operations.

The control module 330 integrates the operations of the whole image processing apparatus. The control module 350 controls the print processing performed by the printer unit 320. The control module 340 controls processing for reading of documents performed by the image reader unit 310. The control module 360 performs image processing in regard to the read document images, such as image quality correction. The control modules 330 and 350 are in the internal laser control unit 321, while the control modules 340 and 360 are in the internal signal processing unit 316.

(1-2-1) Structure of the Control Module 330

The control module 330 performs overall control of the image processing apparatus 30 by sending control instructions and control information to the control modules 340 to 360. The control module 330 is composed of a CPU 331, a flash ROM 332, an SRAM (Static Random Access Memory) 333, and so on, which are connected by an internal bus.

Note that the internal bus is capable of high-speed data transfer, and enables programs to be loaded rapidly to the SRAM 333 when the image processing apparatus is turned on, as well as reducing noise when loading program data. The characteristics of this internal bus are shared by the internal buses of the control modules 340 to 360.

The control module 330 is connected to each of the control modules 340 and 350 respectively by serial cables (cross type). The firmware executed by the CPU 331 is stored in the flash ROM 332. The SRAM 333 is a working memory for maintaining various types of data when the CPU 331 executes the firmware. An NVRAM (non-volatile random access memory) 334, which has a battery backup, stores setting values for executing the firmware, and so on.

A serial interface (hereinafter "serial I/F") 335 is a communication interface for communicating serially with the control module 340. A serial I/F 336 is a communication interface for communicating serially with the control module 350. The control modules 330 to 360 transfer firmware according to serial communication, as is described later. A serial I/F 337 is a communication interface for receiving control data relating to firmware and print jobs from the management unit 31. A video I/F 338 is a communication interface for sending and receiving image data and firmware between the management unit 31 and the control modules 340 and 360.

An operation panel 339, which is an LCD (liquid crystal display) unit that has numeric keys, a print key and a touch panel, is provided on the front of the image processing apparatus 30. When receiving a copy job, the operation panel 339 also receives copy conditions (number of copies, size, etc.) for the copy job.

(1-2-2) Structure of the Control Module 340

The control module 340, which controls read scanning and image processing, includes a CPU 343, a flash ROM 344 an SRAM 345 and so on that are connected by an internal bus. The control module 340 is connected to the control module 330 by a serial cable (cross type).

The CPU 343 controls processing for reading document images, following firmware read from the ROM 344. On activation, the CPU 343 reads necessary setting values from the NVRAM 342, and operates in compliance with these setting values. During operation, the CPU 343 stores various data to the SRAM 345 as appropriate. Note that the NVRAM 342 has a battery backup, as do the NVRAMs in the other modules. The CPU 343 communicates serially with the control module 330 via a serial I/F 346.

An image input unit 348 controls driving of the CCD sensor 315 and soon, to input photo-electrically converted image data into an image processing ASIC (application specific integrated circuit) 347. The image processing ASIC 347 executes various types of image processing such as shading correction, reflectivity-density conversion, MTF correction, density correction, error diffusion and thresholding and outputs obtained image data to the control module 330 and the control module 360. An IR (image reader) load control I/OGA (input output gate array) 341 controls the driving loads of a scan motor, a scan lamp, and so on.

(1-2-3) Structure of the Control Module 350

The control module 350 has approximately the same structure as the control module 330, and includes a CPU 351, a flash ROM 352, an SRAM 353 and so on, which are connected by an internal bus. The control module 350 is connected to the control module 330 and the control module 360 by respective serial cables (cross type).

The CPU 351 controls print processing following firmware stored in the flash ROM 352. In executing the firmware, the CPU 351 reads necessary setting values from an NVRAM 354, and operates in compliance with these setting values. Note that the NVRAM 354 has a battery backup, and is therefore able to maintain setting values even while the image processing apparatus is turned off. When controlling print processing, the CPU 351 stores various types of data in the SRAM 353, which is a working memory.

The CPU 351 controls the driving loads of a motor, a heater, a switch, and so on, via a print load control I/OGA 355. The CPU 351 drives a serial I/F 356 to perform serial communication with the control module 360, and performs serial control with the control module 330 according to a serial I/F 357, to receive and transmit control instructions and firmware and so on.

(1-2-4) Structure of the Control Module 360

The control module 360 includes a CPU 364, a flash ROM 365, an SRAM 366 and so on, which are connected to each other by an internal bus. The control module 360 is further connected to the control module 350 by a serial cable (cross type). The CPU 364 controls processing for correcting image quality, following firmware stored in the flash ROM 365.

Setting values necessary for processing are stored in the NVRAM 367. The SRAM 366 is a working memory. A picture quality correction control GA 363 performs picture quality control such as smoothing, intermediate gray scale reproduction processing, and picture quality correction. An image output unit 362 outputs images by controlling an LD in compliance with image data output from the image quality calibration control GA 363.

(1-3) Structure of Management Units

The following describes the structure of the management unit 31. Note that the management unit 33 has the same structure as the management unit 31, and thus the description of the management unit 31 applies to the management unit 33.

Figure 5:
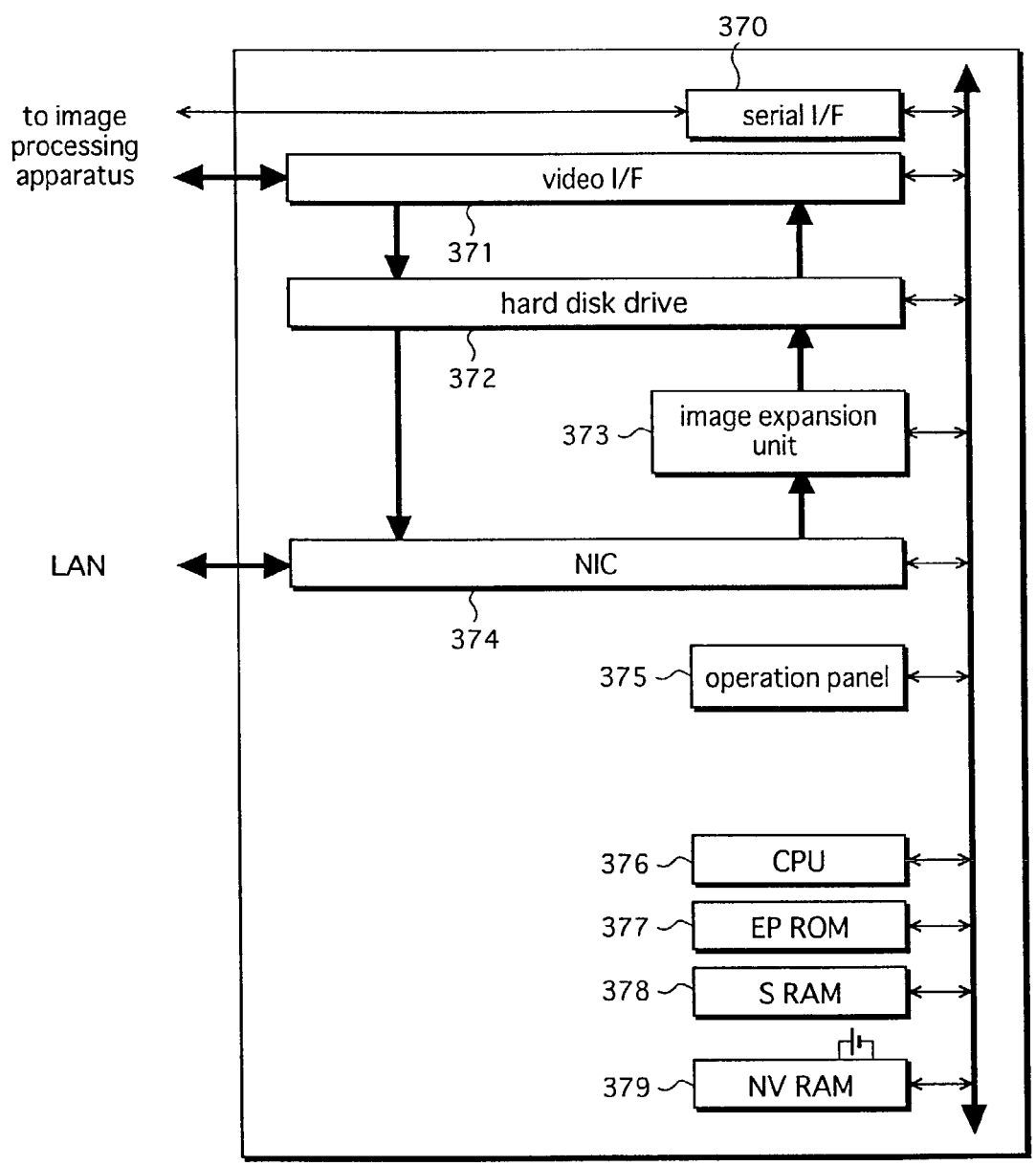
FIG. 5 shows the parts of the hardware structure of a management unit that particularly relate to the present embodiment.

The functions of the management unit 31 include receiving print jobs from a PC, managing the jobs, re-writing firmware, controlling image processing of images to be printed, controlling data conversion of image information received with e-mail and image information to be transmitted with e-mail, and controlling reception and transmission of e-mail to which image information is attached. FIG. 5 shows the structure of the hardware of the management unit 31. Here portions of the management unit 31 that are particularly relevant to the present invention are shown, thus power circuits and the like that are not directly related to the invention are omitted.

The management unit 31 includes a CPU 376, and an EPROM (erasable and programmable read only memory) 337. When the management unit 31 is activated, the CPU 376 reads a program stored in the EPROM 377, and operates according to the program. An SRAM 378 is a working memory for storing temporary data and the like as necessary for the operations of the CPU 376.

The management unit 31, which is connected to the LAN 39 by an NIC 374, receives print jobs and accesses the mail server to obtain e-mail. Print jobs that are received via the LAN 39 are converted by an image expansion unit 373 from PDL (page description language) data to an intermediate code, and the intermediate code is further expanded to bitmap data, which is stored a hard disk drive 372.

Firmware that is received via the LAN 39 is also stored in the hard disk drive 372. In executing a print job, the management unit 31 sends the bitmap data stored in the hard disk drive 372 to the control module 330 via a video I/F 371, and also sends control instructions (paper settings, size, number of copies, etc.) relating to printing out the bitmap data, via the serial I/F 370.

In addition, the management unit 31 includes an operations panel 375 for a user to perform various settings and operations, and an NVRAM 379 for storing various setting values and management information. The operation panel 375 includes an LCD panel, four function keys F1 to F4, and a cursor key for moving a cursor displayed on the display panel. In particular, the F1 key is for activating a program for setting the necessary parameters for the management unit to transmit and receive e-mail. The F1 key has words to this effect thereon, such as "communication settings".

Other than the IP address of the management unit 31, the NVRAM 379 also stores an IP address of the mail server 38 necessary for the management unit 31 to download from the mail server 38, and an account name, a password and so on that are necessary for reception and transmission of e-mail.

Data for print jobs and the like is sent from the NIC 374 of the management unit 31 to the video I/F 338 of the control module 330 via the image expansion unit 373, the hard disk drive 372 and the video I/F 371, in the stated order. Since the data for print jobs and the like is relatively large, the paths from the NIC 374 to the video I/F 338 are connected by a high-speed data bus so that image data can be transferred at high speed.

Note that this also true for the paths from the video I/F 338 via the image correction control GA 363 to the image output unit 362. Furthermore, the paths along which image data for a document read by the scanner unit 310 is sent from the image input unit 248 via the image processing ASIC 347 and the image correction control GA 363 to the image output unit 362 are also a high-speed data bus.

(1-4) Structure of the PCs

The following describes the structure of the PC 34. Note that the structure of the PC 35 is the same as the PC 34, and thus the description of the PC 34 applies to the PC 35.

Figure 6:
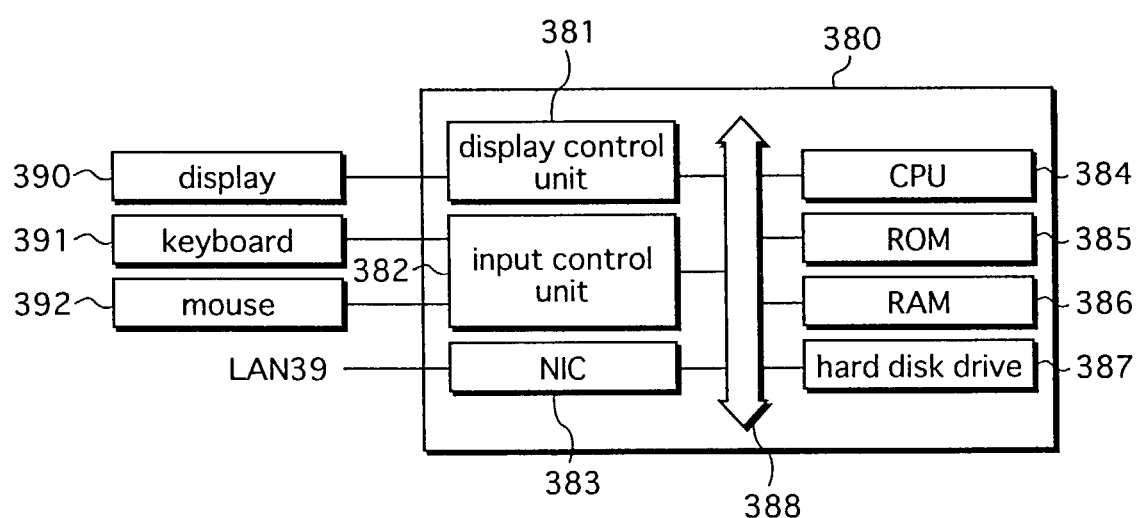
FIG. 6 shows the structure of a computer unit in a personal computer, and its peripheral devices.

FIG. 6 shows the construction of the hardware of the PC 34. The PC 34 is composed of a computer unit 380, a display 390, a keyboard 391 and a mouse 392 connected to the main computer. In the computer unit 380 a CPU 384, a ROM 385, RAM 386 and so on are connected by an internal bus 388. When the PC 34 is turned on, the CPU 384 reads a boot program from the ROM 385 and begins operating. Then, the CPU 384 reads the OS from the hard disk drive 387, which it expands in the RAM 386, and then begins normal operations. In addition to the components described above, a display control unit 381, an input control unit 382 and a NIC 383 are connected to the internal bus 388.

The display 390 displays characters and images according to instructions from the CPU 384, under the control of the display control unit 381. Furthermore, the CPU 384 receives inputs of data from the keyboard 391 and the mouse 392 via the input control unit 382. The PC 34 also transmits print jobs to the image processing apparatuses 30 and 32 that are connected to the LAN 39 via the NIC 383, and has the image processing apparatuses 30 and 32 print the jobs out.

The hard disk drive 387 further stores a document editing application program, an image editing application program, a printer driver, and soon. These programs are expanded as necessary in the RAM 386, and executed by the CPU 384. The printer driver converts application data generated by the application programs to print job data. Specifically, this print job data is translatable by the management unit 31, and is composed of job control information, page control information, and print image information that is written in page description language.

Here, the job control information is control information for the printing apparatus about that particular job, and includes a job identifier, a job name, a job sender name, the number of copies to be made, and a job processing mode (for setting the job mode to priority mode, non-priority mode, job merge mode, job division mode, etc.). The page control information is control information about actually printing the print data on paper, such as the document identifier, the document name, double sided printing, paper size, paper feeder selection, and sort/non-sort mode.

Upon being activated, the printer driver receives inputs according to a predetermined operation screen displayed on the display 390, and creates job control information and page control information. Then, on receiving a print start instruction, the printer driver converts the application data to PDL print image data, sends the print job to the designated image processing apparatus, and has that image processing apparatus print the job out.

(2) Operations of the System

The following describes the operations of the fax system of the present embodiment with reference to the flowcharts.

(2-1) Host Computer Processing

First, the processing performed by the host computer 20 is described.

(2-1-1) Main Loop

Figure 7:
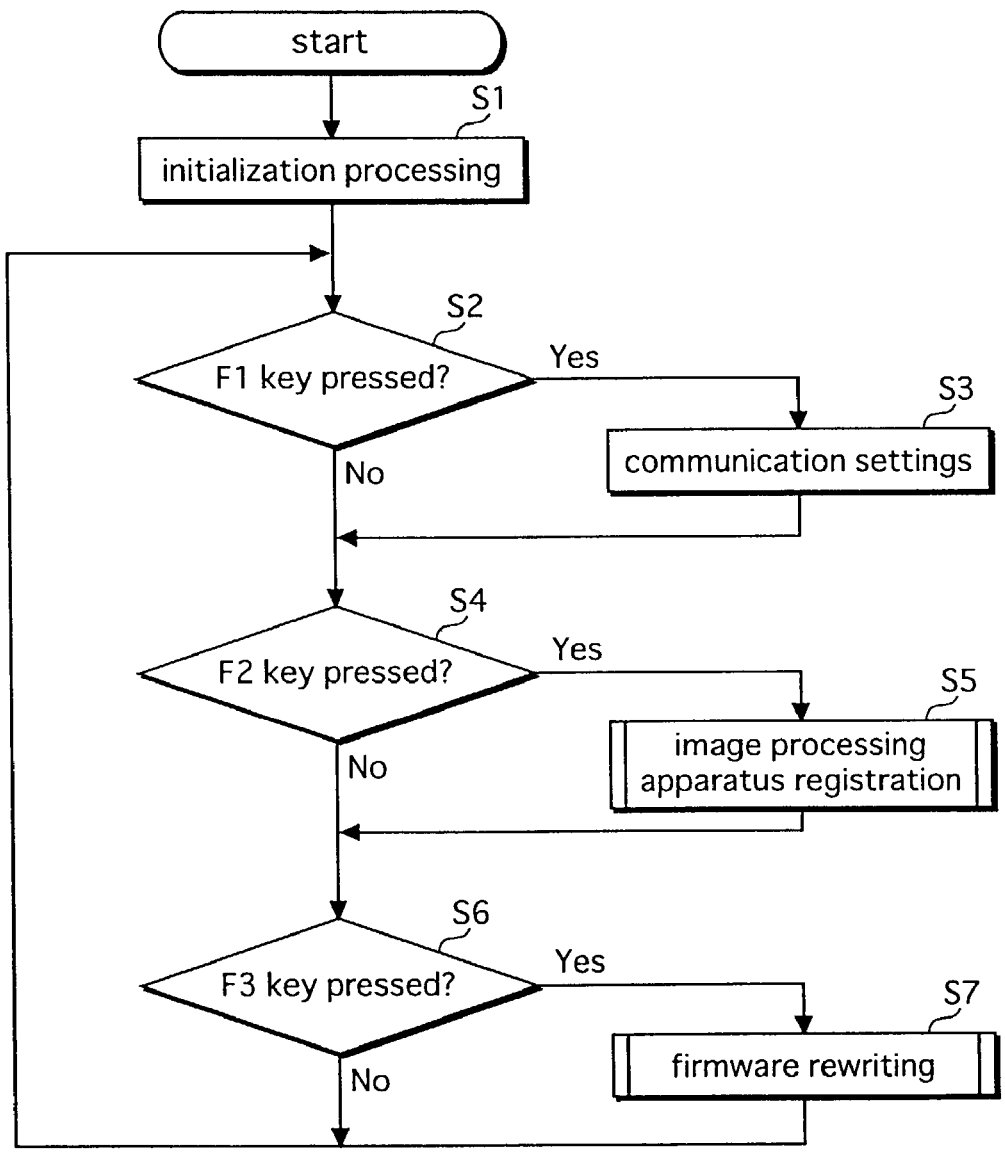
FIG. 7 is a flowchart showing operations of the host computer, and in particular processing performed in relation to the image processing apparatus.

FIG. 7 is a flowchart showing the operations of the host computer 20. Upon being turned on, the host computer 20 executes initialization processing such as that generally performed by computers, for example initialization of the memory and parameters (step S1). Next, the host computer 20 executes processing in response to key input of the F1 to F3 keys on the keyboard 211.

The host computer 20 observes inputs from the keyboard 211, and when it detects that the F1 key has been pressed (step S2, Yes), performs the necessary settings for transmitting e-mail (step S3). In other words, the host computer 20 receives the IP address of the mail server 21 and the e-mail address of the host computer 20, and stores these addresses in the hard disk drive 207. The e-mail address of the host computer 20 is set in the From field when transmitting e-mail.

On detecting a press of the F2 key (step S4, Yes) either when the F1 key is not pressed (step S2, No) or after the processing at step S3, the host computer 20 executes registration processing for registering the image processing apparatus (step S5). In other words, the host computer 20 receives information such as the model name of the image processing apparatus, an e-mail address, and the name, address and telephone number of the user, and stores this information in the registration information table in the hard disk drive 207.

FIG. 8 shows the structure of the registration information table. The registration information table stores for each image processing apparatus information including an item number, image processing apparatus model, and image processing apparatus e-mail address. The "other information" column includes the user name and so on. Note that the e-mail address of the image processing apparatus may instead be the e-mail address of the management unit.

Figure 9:
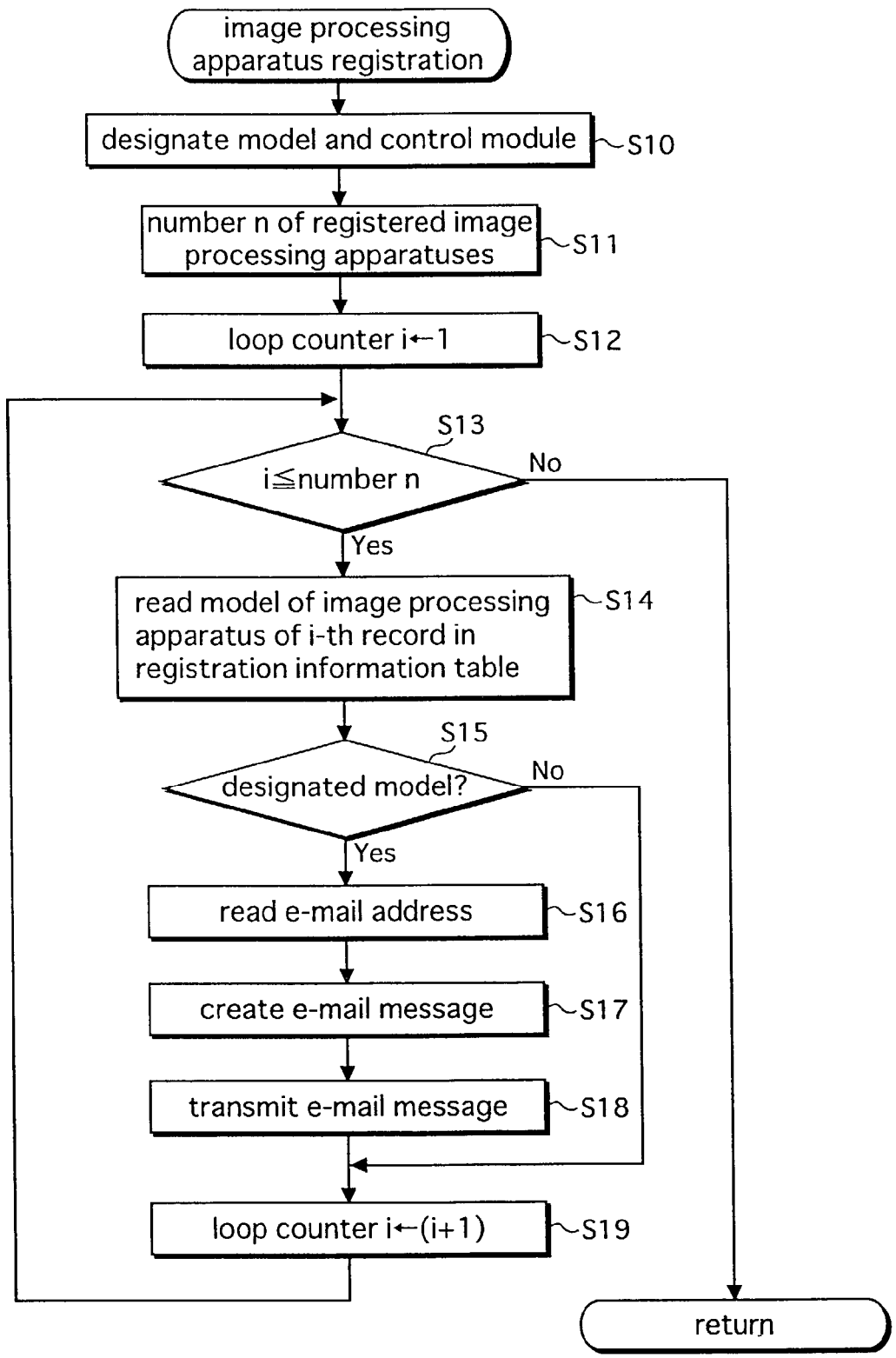
FIG. 9 is a flowchart showing processing performed by the host computer for transmitting firmware.

On detecting a press of the F3 key (step S6, Yes) either when the F2 key is not pressed (step S4, No) or after the processing at step S5 is complete, the host computer 20 transmits firmware to the image processing apparatus (step S7). FIG. 9 is a flowchart showing processing for transmitting firmware.

First, the host computer 20 receives inputs of the model and control module of the image processing apparatus whose firmware is to be rewritten (step S10). This information is input using the keyboard 211 or the mouse 212. The reason that the model and control module are specified is because firmware usually varies according to the model and the control module.

Next, the host computer 20 refers to the registration information table, and calculates a total number n of registered image processing apparatuses (step S11), and sets a loop counter i to 1 (step S12). The host computer 20 compares the loop counter i and the number n calculated at step S11, and if the loop counter i is greater than the number n (step S13, No), ends the processing.

If the loop counter i is equal to or less than the number n (step S13, Yes), the host computer reads the model of the image processing apparatus from the i-th record in the registration information table (step S14), and judges whether that model is a designated model. If the model is a designated model (step S15, Yes), the host computer 20 reads the e-mail address of the image processing apparatus from the i-th record in the registration information table (step S16).

Next, the host computer 20 creates e-mail addressed to the read e-mail address, and attaches the designated firmware to the e-mail (step S17). Since the firmware is stored in advance in a folder in the hard disk drive 207 according to model and control module, the host computer 20 uses the model and control module as a key to read the firmware from the hard disk drive 207.

Here, the structure of the e-mail to which the firmware is attached is described. FIG. 10 shows an example of content of an e-mail to which firmware is attached. The e-mail is divided into a header section and a footer section which are separated by a null line (RFC 822). RFC 822 prohibits binary data being written as is in e-mail. In order to conform to RFC 822, firmware is attached to the body section in compliance with MIME (Multipurpose Internet Mail Extensions; RFC2045, RFC2046, RFC2047) extension specifications.

In addition to various header fields such as "From", "To", "Date" and "Subject", the header section also includes header fields that conform to MIME extension specifications, such as "MIME-Version", "Content-Type", and "Content-Description". Note that each of the header fields are composed of three sections, specifically, a field name, a colon, and a field body. The colon is used to separate the field name and the field body. The field name is the character string starting from the first character and ending with the character directly before the colon. The field body is the character string beginning after the colon.

The body of the Subject field lists a character string in which the model name and the control module number of the image processing apparatus whose firmware is to be rewritten are connected by an underscore. For example, if the model name of image processing apparatus is "model1" and the control module number is "1", the field body lists a character string "model1_1" which is "model1" and "1" connected by an underscore.

The body of the Content-Type field lists "multipart/mixed", and displays that the message section is divided into a plurality of parts. A "boundary" parameter designates a US-ASCII character string ("5kvrZF/hrA" in FIG. 8) that is used as a boundary between each of the plurality of parts.

The body of the Content-Description field lists "Firmware", showing that firmware is attached to the e-mail.

In the body section, the parts are separated by the character string designated in the boundary parameter with two hyphens before the character string ("--5 kvrZF/hrA" in FIG. 10). The part to which the firmware is attached lists a header after the character string that displays the data content in that part. In other words, the body of the Content-Type field lists "application/octet-stream" showing that the attached file is binary data.

The body of a Content-Transfer-Encoding field lists "base64", displaying that the firmware has been converted to a US-ASCII character string according to the Base64 method. Next, the firmware converted to US-ASCII according to the Base 64 method is attached. Note that the method used for converting the firmware to a US-ASCII character string is not limited to the Base64 method, but may be another method. In this case it is necessary to list in the body of the Content-Transfer-Encoding field a character string corresponding the method that is used.

The host computer 20 lists a character string in the last part of the body section that is the boundary parameter with two hyphens both before and after ("--5 kvrZF/hrA--" in FIG. 10). This shows that this part is the end part of the body section.

The host computer 20 sends e-mail created in the format described above to the mail server 83 according to SMTP (step S18). At step S15 when the model is not the designated model, or after finishing the processing at step S18, the host computer 20 increases the loop counter i by one (step S19), proceeds to step S13, and repeats the described processing until the loop counter i exceeds the number n of registered image processing apparatuses.

(2-2) Processing Performed by the Management Units

The following describes the processing performed by the management unit 31.

Figure 11:
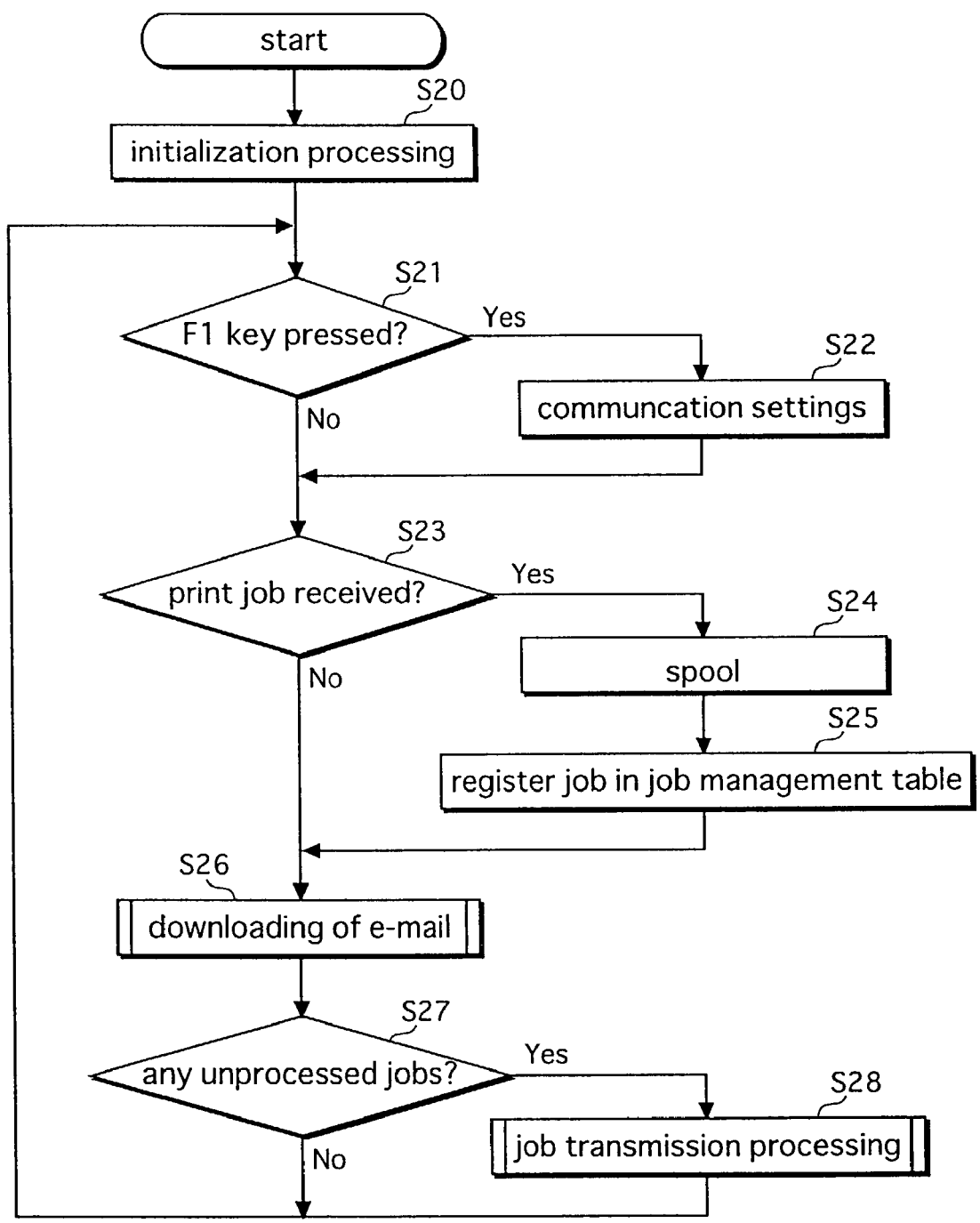
FIG. 11 is flowchart showing the main routine in processing by the management unit.

FIG. 11 is a flowchart showing the processing performed by the management unit 31. The management unit 31 is activated by the power being turned on. After performing general initialization processing such as initialization of the memory and parameters (step S20), the management unit 31 begins ordinary operations.

In ordinary operations, the management unit 31 monitors inputs, and if it detects that the F1 key on the operation panel 375 is pressed (step S21, Yes), it receives the necessary settings for transmitting and receiving e-mail (step S22). In other words, the management unit 31 receives the IP address of the mail server 38, the account name, password, and e-mail address of the management unit 31, and a time interval for regularly checking whether e-mail has arrived, and stores the received parameters in the NVRAM 379.

When the F1 key has not been pressed at step S21, or after the processing at step S22, the management unit 31 checks whether it has received a print job, and if so (step S23, Yes), spools the print job (step S24). In other words, the management unit 31 holds the print job in the hard disk drive 372. Then, the management unit 31 allocates a job number to the print job, and registers the print job in a job management table (step S25). FIG. 12 shows the construction of the job management table. The job management table includes for each job a job number, a job type, supplementary information, and an address.

On receiving a new print job, the management unit 31 adds a value "1", which represents a print job, to the print job type column, and the address where the print job is stored to the address column, at the end of the job management table. Nothing is set in the supplementary information column. Note that if one or more "firmware rewriting jobs" are registered in the job management table, the management unit 31 registers the print job higher in the table than the firmware rewriting jobs.

If a print job is not received at step S23, or after the processing at step S25, the management unit 31 accesses the mail server 38, and downloads e-mail that is addressed to the management unit 31 (step S26). Then, the management unit 31 refers to the job management table, and if there are one or more jobs registered (step S27, Yes), transmits the jobs to the image processing apparatus 30 (step S28).

(2-2-1) Processing for Downloading E-Mail

The following describes e-mail download processing (step S26) with reference to a flowchart.

Figure 13:
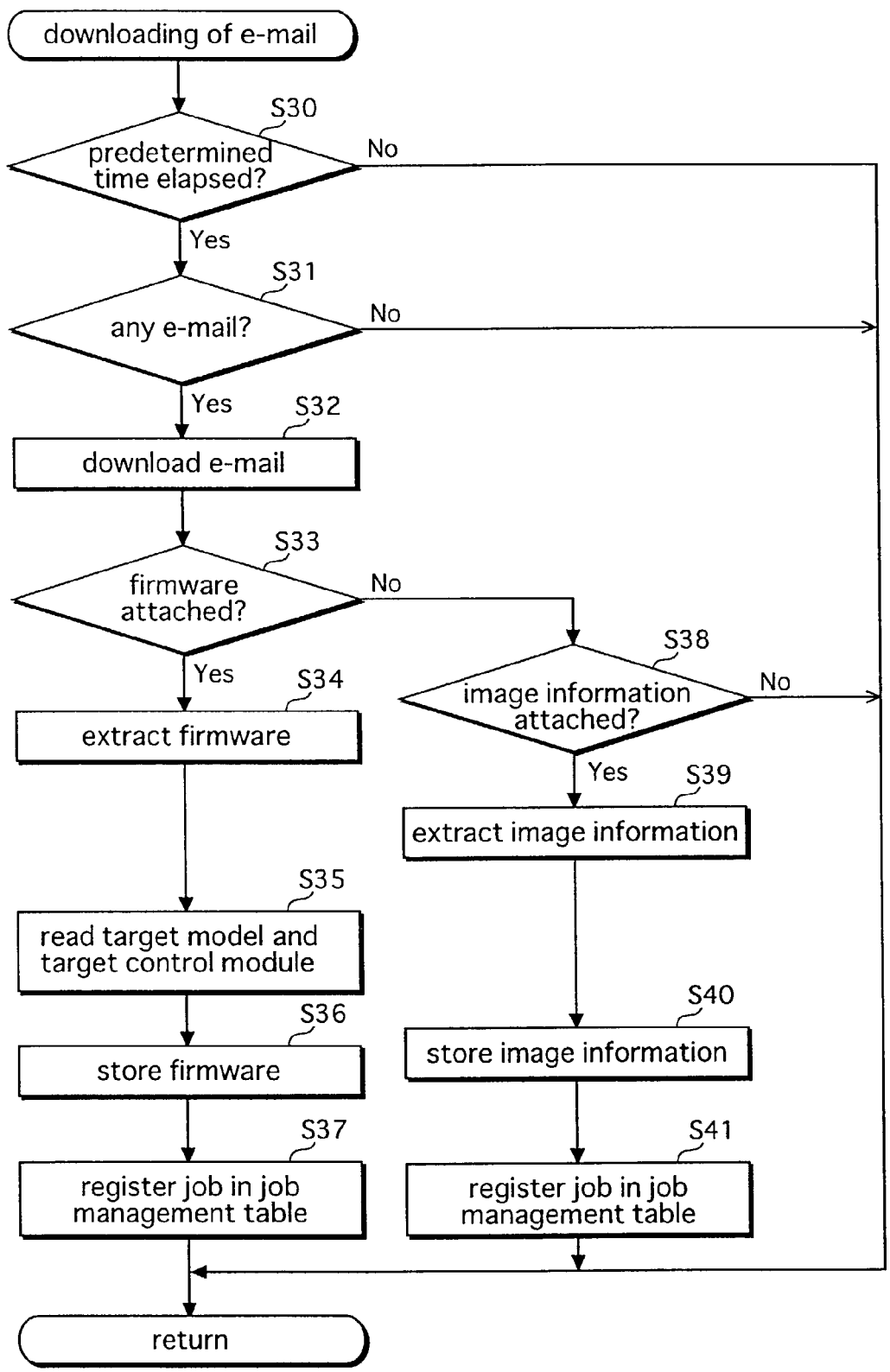
FIG. 13 is a flowchart showing processing by the management unit for downloading e-mail from the mail server (the processing at step S26)

FIG. 13 is a flowchart showing processing performed by the management unit 31 at step S26 for downloading e-mail addressed to the management unit 31 from the mail server 38. The management unit 31 judges whether a predetermined amount of time has passed since last checking for new e-mail, and ends the processing if the predetermined amount of time has not passed (step S30, No).

If the predetermined amount of time has passed (step S30, Yes), the management unit 31 checks whether new e-mail has arrived at the mail server 38, according to POP3 (post office protocol version 3). Note that since POP3 is a protocol over TCP/IP, confirmation of whether e-mail has arrived at the mail server 38, and deletion of e-mail at the mail server 38 are performed together according to TCP procedures. In other words, a TCP session is established before and ended after accessing the mail server 38, and even while POP3 procedures are being executed, delivery confirmation (ACK) and retransmission processing (as required) according to TCP procedures are performed.

If no new e-mail has arrived (step S31, No), the management unit 31 ends the processing. If new e-mail has arrived (step S31, Yes), the management unit 31 downloads the e-mail from the mail server 38, and deletes the original e-mail from the mail server 38 (step S32).

The management unit 31 refers to the down loaded e-mail, and if firmware is attached to the e-mail (step S33, Yes), extracts the firmware by performing a reverse Base 64 conversion of the US-ASCII data attached to the e-mail to restore the binary data (step S34). Then, the management unit 31 reads the model and the control module number from the body of the Subject field in the header section of the message (step S35).

Next, the management unit 31 stores the obtained firmware in the hard disk drive 372 (step S36), and newly registers the firmware rewriting job at the end of the job management table. Here, the management unit 31 adds a value "2", which shows a firmware rewriting job, to the job type column, the address where the firmware is stored in the hard disk drive 372 to the address column, and the control module number to the supplementary information (step S37).

If firmware is not attached to the downloaded e-mail (step S33, No), and if image information is attached (step S38, Yes), the management unit 31 extracts the image information from the e-mail (step S39), expands the image information to bitmap data in the image expansion unit 373, and stores the bitmap data in the hard disk drive 372 (step S40). Then, the management unit 31 registers the print job in the job management table as has been described (step S41).

When neither firmware nor image information is attached to the downloaded e-mail (step S38, No), or when the processing at step S37 or step S41 is complete, the management unit 31 ends the processing.

(2-2-2) Processing for Transmitting a Print Job

The following describes processing performed by the management unit 31 at step S28 for transmitting a job, with reference to a flowchart.

Figure 14:
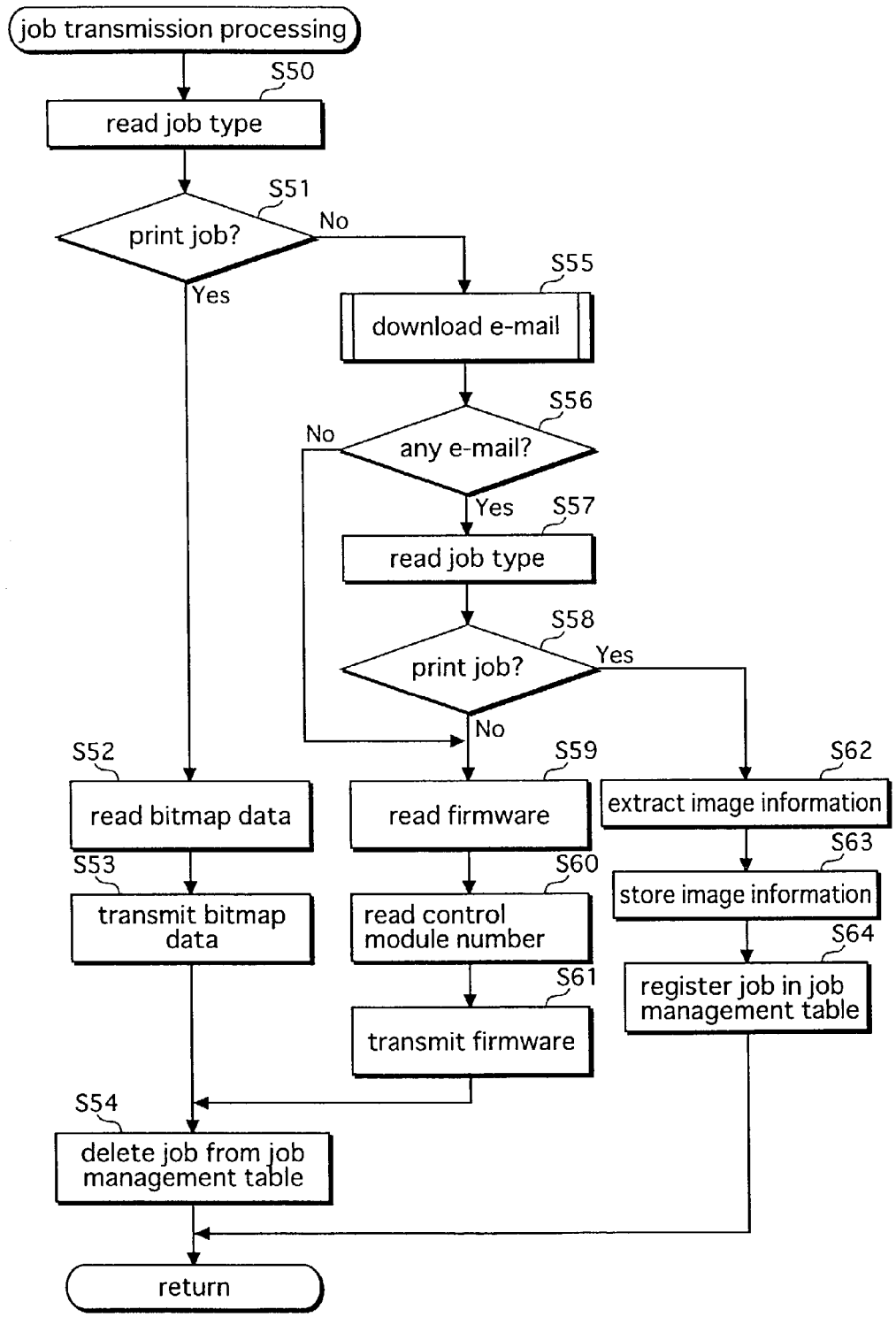
FIG. 14 is a flowchart showing processing by the management unit for transmitting a job to the image processing apparatus and having the image processing apparatus execute the job (the processing at step S28)

FIG. 14 is a flowchart showing processing performed by the management unit 31 at step S28 for transmitting a job to an image processing apparatus. The management unit 31 refers to the job management table to read the type of the job registered at the top of the job management table (step S50), and judges whether the job type is "print job" (value "1") or "firmware rewriting job" (value "2"). If the job type is "print job" (step S51, Yes), the management unit 31 reads the bitmap data for the print job from the address registered in the job management table (step S52), transmits the print job to the image processing apparatus via the video I/F 371, and has the image processing apparatus execute the print job (step S53).

If the job type is "firmware rewriting job" (step S51, No), the management unit 31 downloads the e-mail from the server 38 and deletes the original e-mail from the mail server 38, in the same manner as at step S26 (step S55). After downloading the e-mail (step S56, Yes), the management unit 31 refers to the Content-Description field to read the type of the job relating to the e-mail (step S57).

If the type of the job is "print job" (step S58, Yes), the management unit registers the print job in the job management table. In other words, the management unit 31 extracts the image information from the e-mail (step S62), and after expanding the image information into bitmap data in the image expansion unit 373, stores the bitmap data in the hard disk drive 372 (step S63). Next, the management unit 31 registers the print job in the job management table in the manner described previously (step S64), and ends the processing.

When the management apparatus 31 is unable to download e-mail from the mail server 38 (step S56, No), or when the type of the job is not print job (step S58, No), it reads the firmware related to the firmware rewriting job registered at the top of the job management table from the hard disk drive 372 (step S59).

After the management unit 31 has read the control module number from the job management table (step S60), it sends a control instruction for requesting rewriting of the firmware and the firmware relating to the control request via the serial I/F 370 to the image processing apparatus, to have the image processing apparatus execute the firmware rewriting job (step S61). After completing step S53 or step S61, the management unit 31 deletes the top job from the job management table, and ends the processing (step S54).

In this way, on starting the firmware rewriting processing, all e-mail held by the mail server is downloaded and, if image information is attached to the e-mail, an instruction is sent to the image processing apparatus to have it print out the image information. Therefore, it is possible to avoid a situation in which rewriting of firmware delays printing out of image information.

In the same way, it is possible to avoid a situation in which e-mail that has arrived at the mail server before the commencement of firmware rewriting remains accumulated in the mail server during firmware rewriting. Consequently, it is possible to avoid an increase in the load of the mail server caused by e-mail remaining accumulated in the mail server.

When print jobs in which image information is attached to e-mail occur frequently and must be executed immediately, the management unit must access the mail server at short intervals, and the intervals are often shorter than the time required to rewrite the firmware. The present invention is ideally suited to such a situation.

(3) Processing Executed by the Image Processing Apparatus

The following describes processing executed by the image processing apparatus, with use of a flowchart.

Figure 15:
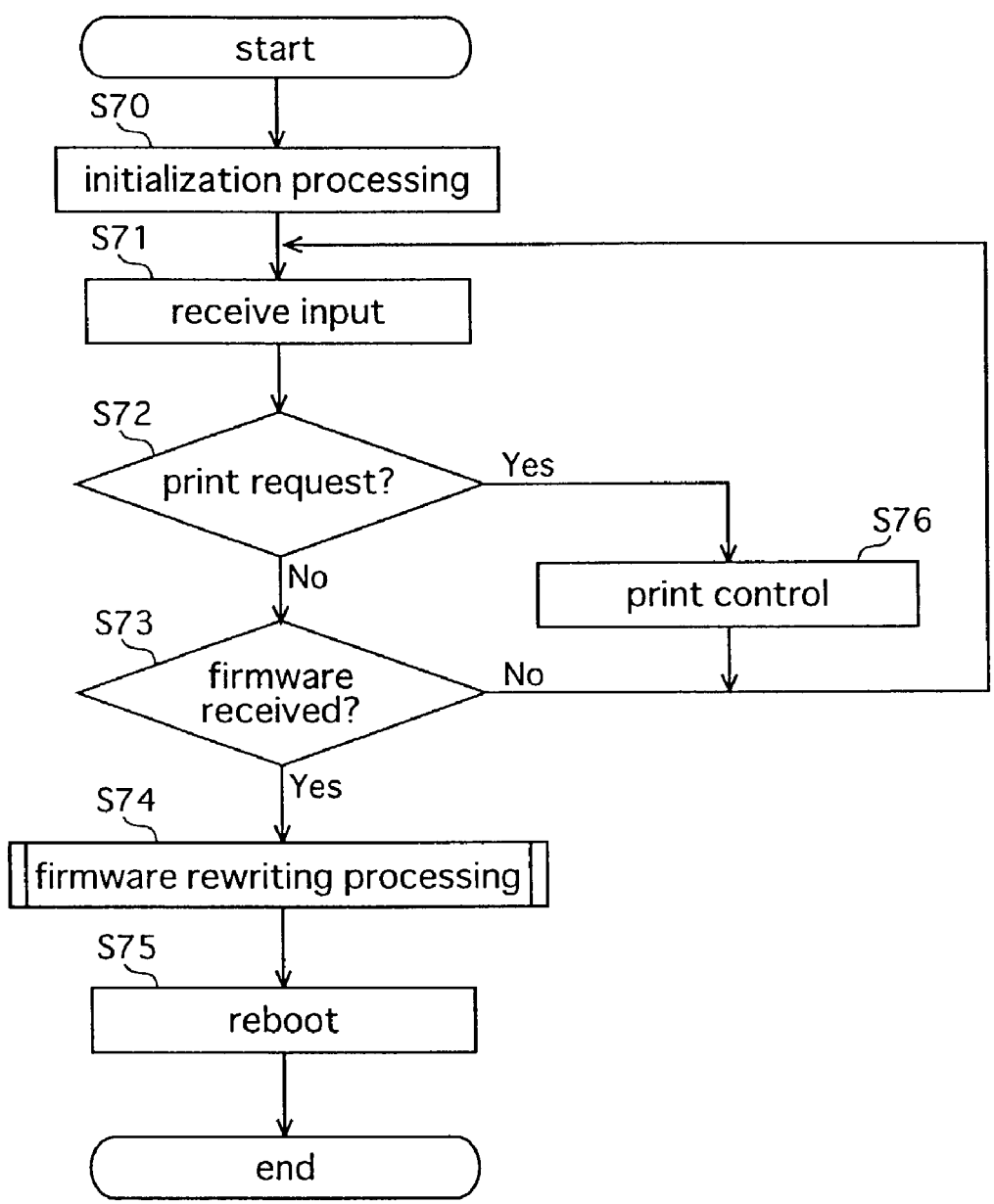
FIG. 15 is a flowchart showing the main routine in processing executed by the image processing apparatus.

FIG. 15 is a flowchart showing the main routine of the processing executed by image processing apparatus. The image processing apparatus commences processing by the power being turned on, and executes initialization processing such as clearing the memory in each control module and standard mode settings (step S70). After completing initialization processing, the image processing apparatus executes processing to receive various types of inputs together (step S71). Here, input denotes, for example, input of print job requests, firmware rewrite requests and so on, received by the operation panel, sensor, serial I/F and video I/F.

If the image processing apparatus receives a print request, in other words, a copy request according to PRINT key input, or a print job from the management unit 31 (step S72, Yes), it executes print control (step S76). Print control is processing for operations to form an image, and denotes a control module driving the various parts (scanner unit, printer unit) of the image processing apparatus to execute image formation relating to the print request.

If the received input is not a print request (step S72, No) and is firmware (step S73, Yes), the image processing apparatus executes firmware rewriting processing (described later) (step S74), reboots, and ends the processing (step S75). Note that after completing the processing at step S76, or when firmware is not received at step S73, the image processing apparatus returns to step S71 and waits again for an input.

(3-1) Processing for Rewriting Firmware

The firmware rewriting processing performed at step S74 by the image processing apparatus is described with reference to a flowchart.

Figure 16:
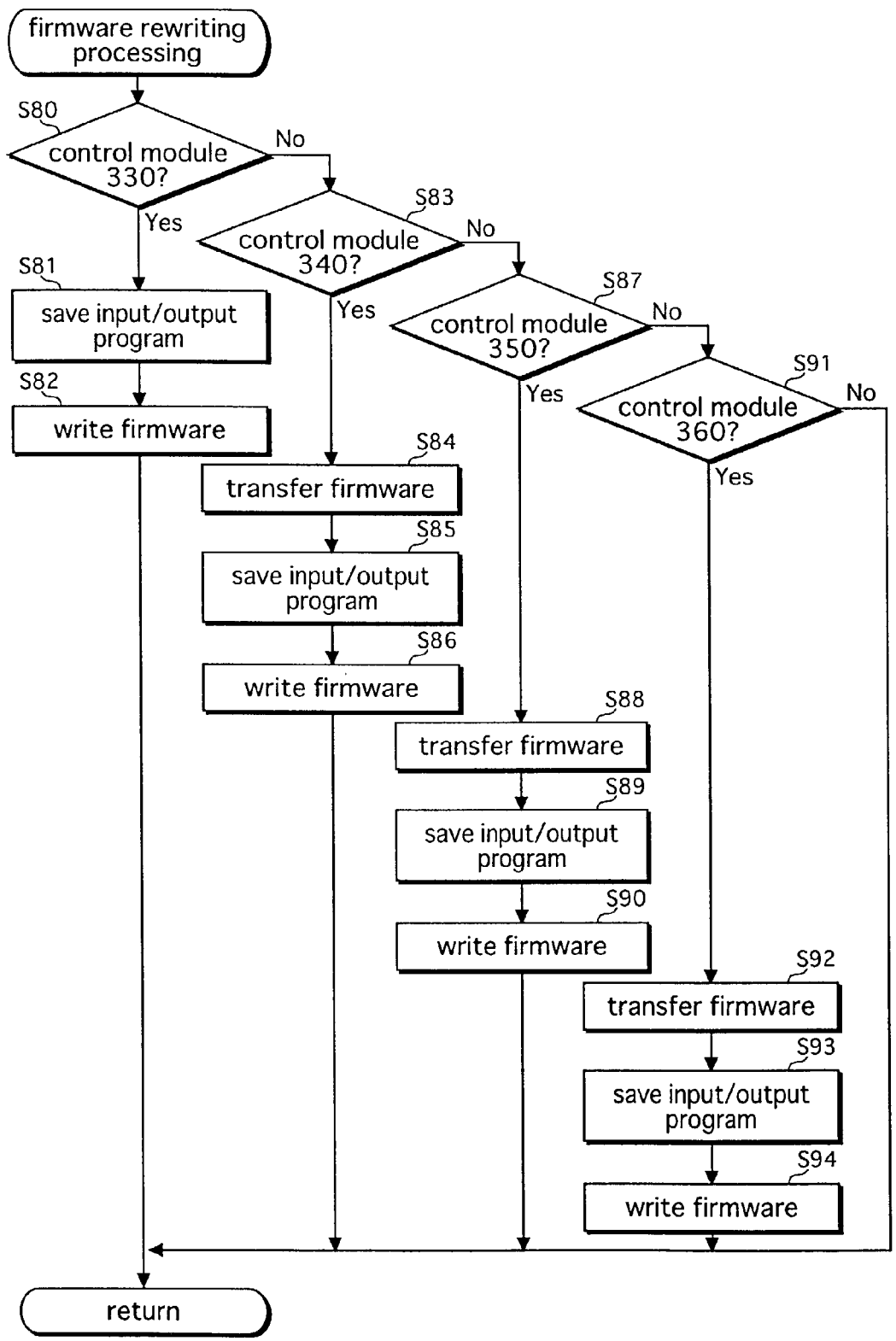
FIG. 16 is a flowchart showing processing by the image processing apparatus for rewriting firmware (the processing at step S74)

FIG. 16 is a flowchart showing the firmware rewriting processing. The image processing apparatus first judges whether the received firmware is for the control module 330. If the supplementary information in the job management table is "1", the image processing apparatus judges that the firmware is for the control module 330 (step S80, Yes). After saving an input/output program for writing the firmware to the flash ROM to its SRAM, the control module 330 writes the firmware to its flash ROM following the saved input/output program (step S82).

If the firmware is not for the control module 330 (step S80, No) and the firmware is for the control module 340, in other words, if the supplementary information in the job management table is "2" (step S83, Yes), the image processing apparatus transfers the firmware to the control module 340 (step S84). After saving an input/output program to its SRAM (step S85), the control module 340 writes the firmware to its flash ROM following the input/output program (step S86).

If the supplementary information in the job management table is "3", the firmware is judged not to be for the control module 340 (step S83, No), but to be for the control module 350 (step S87, Yes), the image processing apparatus transfers the firmware to the control module 350 (step S88). After saving an input/output program to its SRAM, the control module 350 writes the firmware to its flash ROM following the input/output program (step S90).

Similarly, when the firmware is not for the control module 350 (step S87, No), but is judged to be for the control module 360 (step S91, Yes), the image processing apparatus transfers the firmware to the control module 360 (step S92). After saving an input/output program in its SRAM, the control module 360 writes the firmware to its flash ROM following the input/output program (step S94).

When the image processing apparatus refers to the supplementary information in the job management table but is unable to judge which of the control modules 330 to 360 the firmware is for (step S91, No), the image processing apparatus ends processing without doing anything.

Second Embodiment

The following describes a second embodiment of the present invention. The structure of the fax system of the present embodiment is approximately the same as that of the first embodiment, and only the procedure performed by the management unit for accessing the mail server and obtaining e-mail is different. Accordingly, the following description focuses on the processing performed by the management unit to obtain e-mail.

The management unit of the present embodiment has two types of accounts for downloading e-mail from the mail server. One account is for receiving e-mail to which image information is attached (hereinafter "image account"), while the other is for receiving e-mail to which firmware is attached (hereinafter "firmware account").

The management unit accesses the mail server regularly at an interval determined for each account, and downloads mail addressed to each account. In the present embodiment, the interval at which the mail server is accessed to download e-mail to which image information is attached is referred to as "checking interval "1", while the interval at which the mail server is accessed to download e-mail to which firmware is attached is referred to as "checking interval 2".

(1) Ordinary Downloading of E-Mail

The following describes processing when regularly accessing the mail server to download e-mail.

Figure 17:
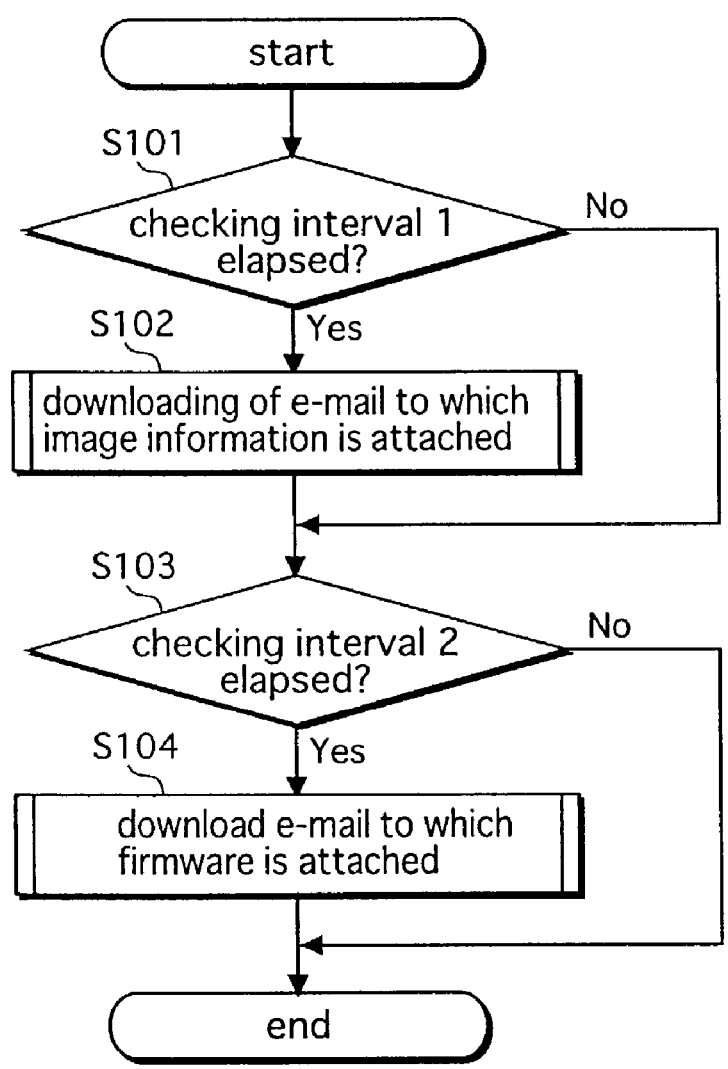
FIG. 17 is a flowchart showing a procedure performed by the management unit for downloading e-mail (the processing at step S26)

FIG. 17 is a flowchart showing the procedure performed by the management unit for downloading e-mail. This is the procedure at step S26. The management unit judges whether a checking interval 1 has elapsed since last accessing the mail server to check for e-mail. If a checking interval 1 has elapsed (step S101, Yes), the management unit accesses the mail server and checks whether e-mail has arrived at the image account. If e-mail has arrived at the image account, the management unit downloads the e-mail (step S102).

After the processing at step S102, or when a checking interval 1 has not elapsed at step S101, the management unit judges whether a checking interval 2 has elapsed since accessing the firmware account to check for e-mail. If a checking interval 2 has elapsed (step S103, Yes), the management unit accesses the mail server and checks whether e-mail has arrived at the firmware account. If e-mail has arrived at the firmware account, the management unit downloads the e-mail (step S104).

If a checking interval 2 has not elapsed at step S103, or if the processing at step S104 is complete, the management unit ends the processing for downloading e-mail.

Figure 18:
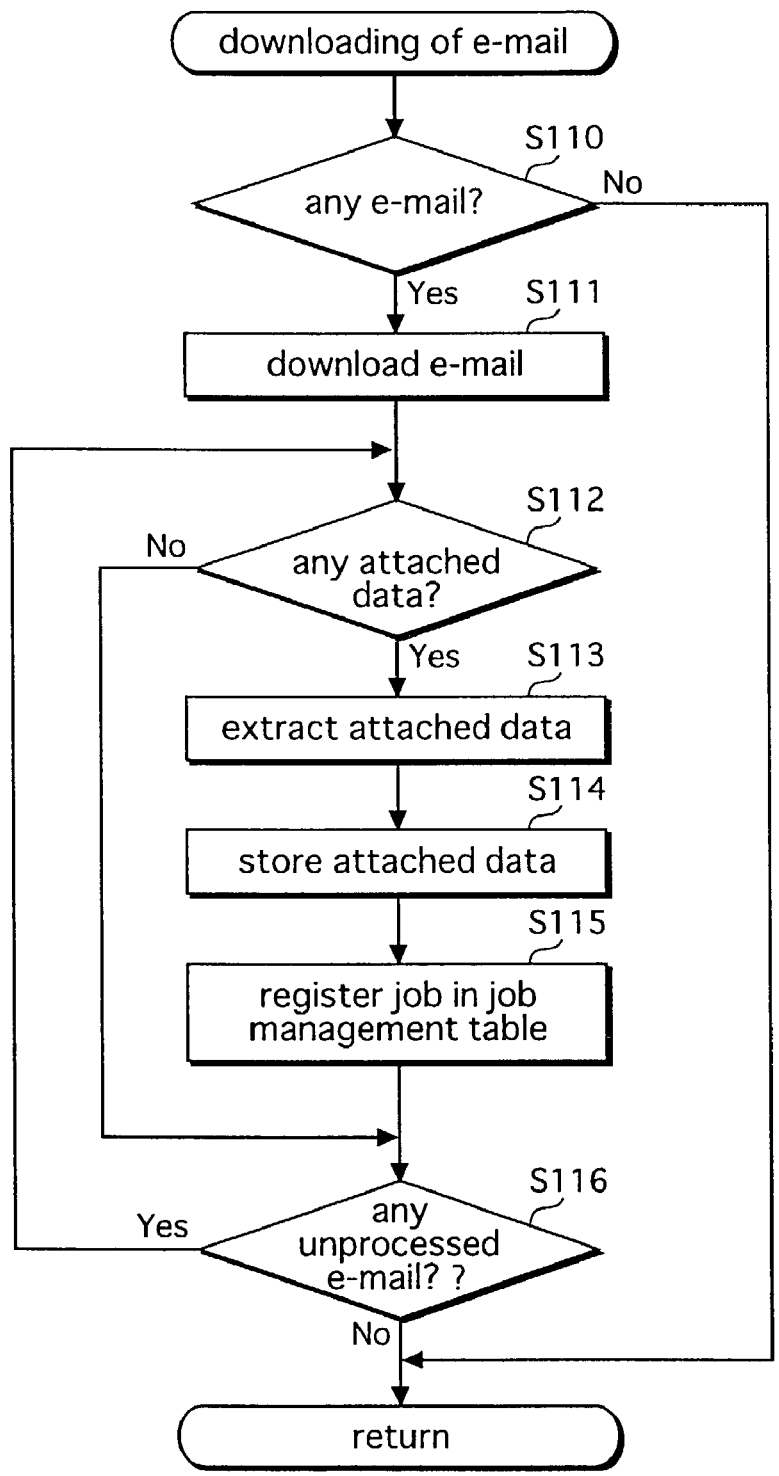
FIG. 18 is a flowchart showing processing by the management unit for downloading e-mail for each account.

Since the only difference between the processing at steps S102 and S104 is the account used, the following description applies to both steps. FIG. 18 is a flowchart showing the processing for downloading e-mail for each account. First, the management unit notifies the mail server of the account name, and checks whether e-mail has arrived addressed to the account. If e-mail has arrived (step S110, Yes), the management unit downloads the e-mail and then deletes the original e-mail from the mail server (step S111).

Next, the management unit checks whether there is data (image information in the case of step S102, and firmware in the case of step S104) attached to the e-mail, based on the value of the Content-Type field. In other words, if firmware is attached, there is a display part, as described earlier. If image information is attached, there is an "image/tiff" part. These parts enable the management unit to judge whether there is attached data or not.

Here, image information attached to e-mail denotes image information that is compressed according to MH encoding, then converted into TIFF-F format before being MIME converted and attached to e-mail. FIG. 19 shows one example of e-mail to which image information is attached. The structure of the e-mail in FIG. 19 is approximately the same as that in FIG. 10, and includes a header section and a footer section that are separated by a null line. The difference between the e-mails in FIG. 10 and FIG. 19 is what is displayed for the Content-Type in the body section that shows the type of the attached data.

When image information is attached (step S112, Yes), the management unit extracts the US-ASCII characters in the attached data section, converts the attached data back into binary data according to reverse Base64 conversion (step S113), and stores the binary data in the hard disk drive 372 (step S114) Next, the management unit registers the print job or the firmware rewriting job in the job management table (step S115). The job is registered in the manner described in the first embodiment.

When there is no attached data (step S112, No), or after the processing at step S115, the management unit checks whether there is any unprocessed e-mail, and if there is any (step S116, Yes), returns to step S113. If there is no unprocessed e-mail (step S116, No), or if there was no e-mail to start with (step S110, No), the management unit reverts to higher level processing.

(2) Downloading of E-Mail when Rewriting Firmware

The following describes downloading of e-mail directly before rewriting firmware. As has been described, the account for receiving image information and the account for receiving firmware are different. Therefore, when downloading e-mail directly before rewriting the firmware, the management unit checks whether e-mail has arrived for the image account, and if so, obtains the e-mail.

Figure 20:
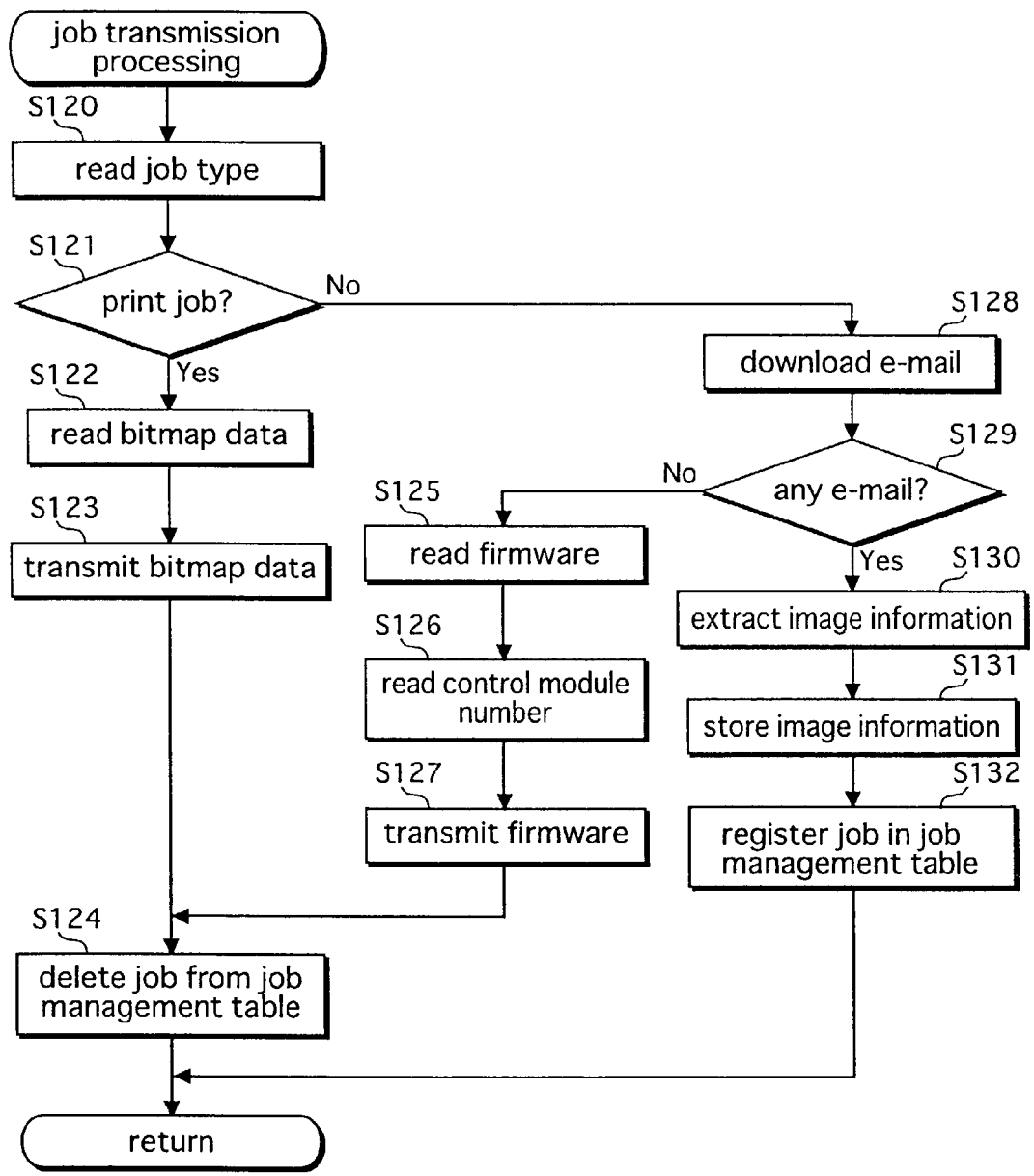
FIG. 20 is a flowchart showing processing by the management unit for downloading e-mail.

FIG. 20 is a flowchart showing processing for downloading e-mail, and corresponds to FIG. 14 in the first embodiment. The management unit reads the type of the job registered at the top of the job management table (step S120). If the job is a print job (step S121, Yes), the management unit reads the bitmap data (step S122), and sends the read bitmap data to the image processing apparatus (step S123).

If the job registered at the top of the job management table is not a print job (step S121, No), the management unit designates the image account, accesses the mail server, and tries to download e-mail to which image information is attached (step S128). If e-mail has arrived at the mail server for the image account (step S129, Yes), the management unit downloads the e-mail, and deletes the original e-mail from the mail server.

Next, the management unit extracts the image information attached to the downloaded e-mail (step S130), and stores the extracted image information in the hard disk drive (step S131). Then, the management unit registers the print job in the job registration table, based on the various types of information in the header section of the e-mail to which the image information is attached (step S132), and ends all processing.

If there is no e-mail to be downloaded (step S129, No), the management unit reads the firmware from the hard disk drive (step S125), and reads the control module number from the job management table (step S126). Then, the management unit designates the control module number and transmits the firmware to the image processing apparatus (step S127).

After completing the processing at step S123 or step S127, the management unit deletes the top job from the job management table (step S124), and ends the processing.

In this way, e-mail to which firmware is attached is not downloaded directly before updating firmware, but rather, only e-mail to which image information is attached is downloaded directly before updating firmware. Consequently, delays in the firmware rewriting processing due to downloading of e-mail to which firmware is attached can be avoided.

Furthermore, since an image processing apparatus is generally composed of a plurality of control modules, in order to rewrite firmware and execute print jobs in parallel it is necessary to connect the control modules with a high-speed, large-capacity bus capable of executing control instructions and control parameters for executing print jobs, and firmware simultaneously. Various measures are necessary to provide such buses in the image processing apparatus, such as measures against noise. Even more of a problem is that it is unrealistic in terms of cost to provide an expensive bus apparatus expressly for the purpose of rewriting firmware considering that firmware is only rewritten occasionally.

For example, Japanese patent application No. 11-7382 discloses a technique by which, by employing a redundant structure, it is possible to perform ordinary operations, such as execute print jobs and the like, using existing firmware while simultaneously rewriting the firmware, and then switch to using the updated firmware at an appropriate time. This redundant structure enables firmware to be updated without interrupting the operations of the image processing apparatus.

However, this structure, in addition to requiring complicated structure control and special control to prevent malfunctions, is not realistic in terms of cost. In contrast, the present invention avoids complicated processing and increased costs that accompany a redundant structure by transferring firmware using communication lines that are also used for transmission and reception of control instructions and control parameters, while keeping delays in print job processing to a minimum.

Note that in both the first and second embodiments firmware denotes types of programs and data in a computer that are not dynamically modified by the computer, and are not updated by a user. Types of firmware include, for example, activation programs, input/output programs, control programs for the image processing circuit and/or the drive circuit of an image processing apparatus, and control data, such as OSs, interpreters, compilers, and BIOS.

The present invention has been described based on, but is not limited to, the above-described embodiments. Modifications such as the following are possible.

Modifications (1) In the above-described embodiments the management unit and the image processing apparatus are described as separate apparatuses, but instead the image processing apparatus may include the functions of the management unit. For example, one of the control modules may carry out the functions of the management unit, or an additional module that carries out the functions of the management unit may be integrated into the image processing apparatus.

Furthermore, the effects of the present invention may be obtained by an image processing apparatus that has the described image processing method executed in a management unit or an image processing apparatus that includes the functions of the management unit. The effects of the present invention may also be obtained by an image processing program that has the image processing method executed in a management unit or an image processing apparatus that includes the functions of the management unit.

A computer-readable recording medium on which the image processing program is stored that has a computer execute the image processing method also obtains the effects of the present invention.

(2) In the above-described embodiments the example is used of an MFP as the image processing apparatus, but the present invention may be applied to any other apparatus that has Internet and fax functions and whose firmware can be updated, for example a fax reception apparatus that has Internet and fax functions.

Furthermore, in the above-described embodiments the mail server is accessed regularly to download e-mail to which image information is attached, but instead the mail server may be accessed when a particular event occurs, regularly or irregularly. An example of irregular access is access in response to a request by the user.

(3) The time interval at which the image processing apparatus accesses the mail server is not specified in the embodiments, however the shorter the interval at which firmware rewriting processing is not performed, the quicker image information accumulated in the mail server can be transmitted to the image processing apparatus. As a result the wait time for processing the image information can be reduced.

(4) In the above-described embodiments, "Firmware" in the body of the Content-Description field shows that firmware is attached to the e-mail, however the effects of the present invention can be obtained by listing a US-ASCII character string other than "Firmware" to express that firmware is attached.

(5) In the above-described embodiments, before executing a firmware rewriting job, the server is first accessed to check if any print jobs have been accumulated, and any accumulated print jobs are downloaded and executed. However, the following procedure is also possible.

The job management table is examined each time a job is executed, and if a firmware rewriting job is in a predetermined position in the order of execution, the mail server is accessed to confirm whether any print jobs have been accumulated. Any accumulated print jobs are executed before executing the firmware rewriting job.

In this case, in addition to judging whether to access the mail server according to whether a firmware rewriting job is in a particular position in the order of execution, it is also possible to access the mail server according to whether the position of a firmware job is equal to or higher than a predetermined position. For example, if the predetermined position is third position in the order, the mail server is accessed before executing the firmware rewriting job if the firmware rewriting job is third, second, or first in the order.

In yet another method, the mail server may be accessed a plurality of times before a firmware rewriting job is executed. In other words, the mail server is accessed a plurality of times, any accumulated print jobs are downloaded, and those print jobs are executed before the firmware rewriting job is executed. In this way, print jobs that have arrived at the server can be processed before the firmware rewriting job is executed.

Although the present invention has been fully described by way of examples with reference to the accompanying drawings, it is to be noted that various changes and modification swill be apparent to those skilled in the art. Therefore, unless otherwise such changes and modification s depart from the scope of the present invention, they should be construed as being included therein.

What is claimed is:

1. An image processing apparatus comprising:
a firmware rewriting unit that executes firmware rewriting processing;
an access unit that accesses a mail server to download an email, regularly or irregularly;
an image data obtaining unit that, on detecting that the firmware rewriting unit is to execute the firmware rewriting processing, has the access unit access the mail server to see if there is any email which was sent to the image processing apparatus, and if there is the email, the image data obtaining unit has the access unit download the email form the mail server and obtains image data attached with the email before the firmware rewriting unit executes the firmware rewriting processing;
an image data processing unit that processes the image data obtained by the image data obtaining unit; and
a processing control unit that, after the image data processing unit processes the image data, has the firmware rewriting unit execute the firmware rewriting processing.

2. The image processing apparatus of claim 1, further comprising:
a processing prohibition unit that prohibits processing of image data while the firmware rewriting processing is being executed.

3. The image processing apparatus of claim 1, further comprising:
a plurality of control modules that process the image data in coordination with each other; and
a communication line by which the control modules communicate,
wherein the firmware rewriting unit conveys the firmware via the communication line.

4. The image processing apparatus of claim 1, wherein the image data obtaining unit has the access unit download all emails which were sent to the image processing apparatus from the mail server and obtains all image data that is attached with the emails.

5. The image processing apparatus of claim 4, wherein the processing control unit has the firmware rewriting processing executed after the image data processing unit has processed all the image data.

6. The image processing apparatus of claim 1, wherein the access unit accesses the mail server at an interval that is shorter than a time required for the firmware rewriting processing.

7. A management apparatus comprising:
a firmware rewriting instruction unit that instructs rewriting of firmware to the image processing apparatus;
an access unit that accesses a mail server to download an email, regularly or irregularly;

an image data obtaining unit that, on detecting that the firmware rewriting instruction unit is to instruct the rewriting of firmware, has the access unit access the mail server to see if there is any email which was sent to the image processing apparatus, and if there is the email, the image data obtaining unit has the access unit download the email from the mail server and obtains image data attached with the email before the firmware rewriting instruction unit instructs the rewriting of firmware; and a processing control unit that instructs the rewriting of the firmware after instructing processing of the image data obtained by the image data obtaining unit.

8. An image processing method performed by an image processing apparatus that accesses a mail server to download an email regularly or irregularly, comprising:

a detection step of detecting that firmware rewriting processing is to be executed;

an access step of accessing, on detecting that the firmware rewriting processing is to be executed, the mail server to see if there is any email which was sent to the image processing apparatus, and downloading the email from the mail server if there is the email;

an obtaining step of obtaining image data attached with the downloaded email before the firmware rewriting processing is executed; and a rewriting step of executing the firmware rewriting processing after the obtained image data is processed.

9. The image processing apparatus of claim 1, further comprising:

a job management table for managing one or more firmware rewriting jobs and print jobs; and a judging unit that judges whether a job registered in the job management table is a firmware rewriting job or a print job, wherein the image data obtaining unit obtains the image data when the judging unit judges that a job is a firmware rewriting job.

10. The image processing apparatus of claim 9, further comprising:

a judgement unit that judges whether a print job is attached to the e-mail downloaded by the access unit.

11. The image processing apparatus of claim 9, wherein the job management table manages jobs obtained by the access unit.

12. A non-transitory computer readable recording medium containing a computer program causing a computer provided in an image processing apparatus that accesses a mail server to download an email regularly or irregularly, to execute processing comprising:

a detection step of detecting that firmware rewriting processing is to be executed;

an access step of accessing, on detecting that the firmware rewriting processing is to be executed, the mail server to see if there is any email which was sent to the image processing apparatus, and downloading the email from the mail server if there is the email;

an obtaining step of obtaining image data attached with the downloaded email before the firmware rewriting processing is executed; and a rewriting step of executing the firmware rewriting processing after the obtained image data is processed.

* * * * *